(12) United States Patent
Choi

(10) Patent No.: US 10,430,148 B2
(45) Date of Patent: Oct. 1, 2019

(54) SYNCHRONIZATION SYSTEM COMPRISING DISPLAY DEVICE AND WEARABLE DEVICE, AND CONTROLLING METHOD

(71) Applicant: LG ELECTRONICS INC., Seoul (KR)

(72) Inventor: Kyungdong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 15/566,659

(22) PCT Filed: May 28, 2015

(86) PCT No.: PCT/KR2015/005380
§ 371 (c)(1),
(2) Date: Oct. 13, 2017

(87) PCT Pub. No.: WO2016/167406
PCT Pub. Date: Oct. 20, 2016

(65) Prior Publication Data
US 2018/0101352 A1     Apr. 12, 2018

(30) Foreign Application Priority Data

Apr. 14, 2015   (KR) ........................ 10-2015-0052478

(51) Int. Cl.
*G06F 3/14*        (2006.01)
*G09G 5/12*        (2006.01)
(Continued)

(52) U.S. Cl.
CPC ............ *G06F 3/1454* (2013.01); *G06F 1/163* (2013.01); *G06F 3/0488* (2013.01);
(Continued)

(58) Field of Classification Search
CPC ............................... G06F 3/1454; G06F 1/163
See application file for complete search history.

(56) References Cited

U.S. PATENT DOCUMENTS

2002/0080036 A1*  6/2002  Rabanne ................. G01S 19/17
                                                                340/573.1
2009/0323998 A1   12/2009  Tarvonen et al.
(Continued)

FOREIGN PATENT DOCUMENTS

KR     1020080055419       6/2008
KR     1020090049153       5/2009
(Continued)

OTHER PUBLICATIONS

PCT International Application No. PCT/KR2015/005380, Written Opinion of the International Searching Authority dated Jan. 14, 2016, 28 pages.

*Primary Examiner* — Dong Hui Liang
(74) *Attorney, Agent, or Firm* — Lee, Hong, Degerman, Kang & Waimey

(57) ABSTRACT

Disclosed are a synchronization system comprising a display device and a wearable device, and a controlling method. The synchronization system comprises: a display device for receiving a preset touch gesture, converting a displayed background image to a preset image, displaying the preset image, and transmitting a synchronization signal to a wearable device; and the wearable device for, when receiving the synchronization signal from the display device, displaying an image which is identical to the preset image of the display device, and synchronizing data with the display device.

13 Claims, 22 Drawing Sheets

(51) Int. Cl.
    *G06F 3/147*         (2006.01)
    *G06F 3/0488*       (2013.01)
    *G06F 1/16*          (2006.01)
    *H04W 4/02*         (2018.01)
    *G09G 5/14*          (2006.01)

(52) U.S. Cl.
    CPC .......... *G06F 3/04883* (2013.01); *G06F 3/147* (2013.01); *G09G 5/12* (2013.01); *G09G 5/14* (2013.01); *H04W 4/02* (2013.01); *G09G 2370/16* (2013.01)

(56) References Cited

U.S. PATENT DOCUMENTS

| | | | |
|---|---|---|---|
| 2012/0036450 A1* | 2/2012 | Canton | H04M 1/72527 715/748 |
| 2015/0186398 A1* | 7/2015 | Yan | G06F 17/30268 715/777 |
| 2016/0048322 A1* | 2/2016 | Raffa | G06F 3/04883 715/733 |
| 2016/0050710 A1* | 2/2016 | Hagan | H04L 63/0846 370/338 |
| 2016/0140379 A1* | 5/2016 | Pedersen | G06K 9/00919 726/19 |
| 2017/0163715 A1* | 6/2017 | Fang | H04L 29/08 |

FOREIGN PATENT DOCUMENTS

| | | |
|---|---|---|
| KR | 1020130103268 | 9/2013 |
| KR | 1020150033204 | 4/2015 |

\* cited by examiner

FIG. 10
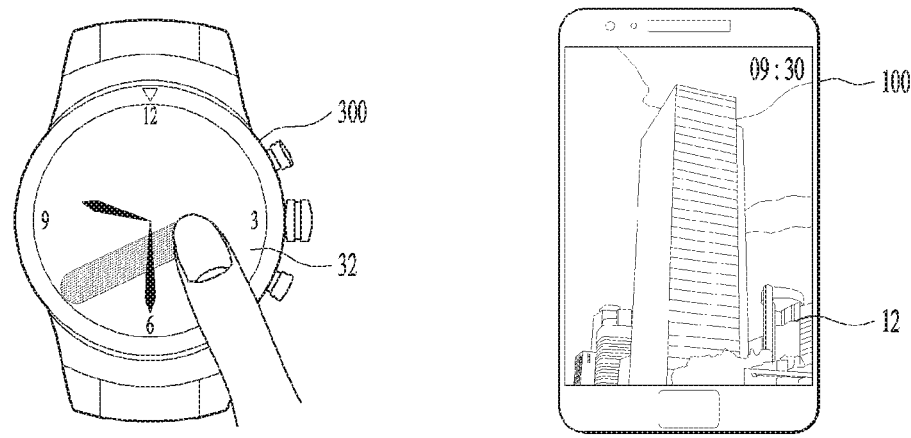
(a)
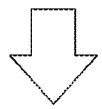
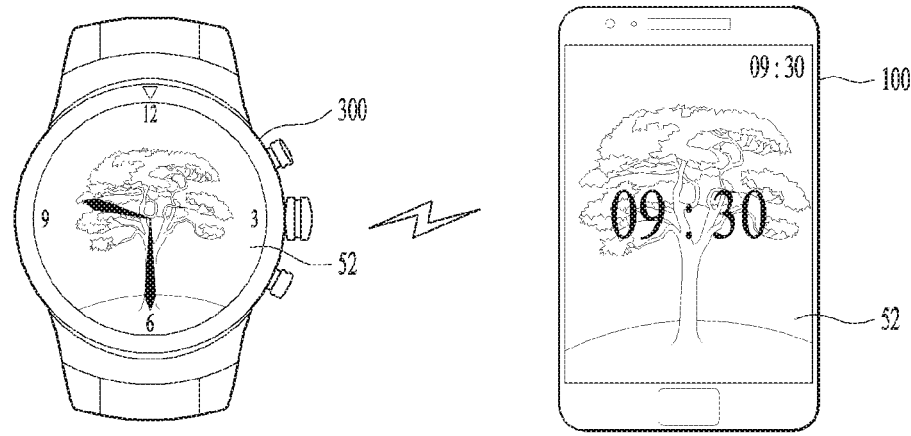
(b)

FIG. 18
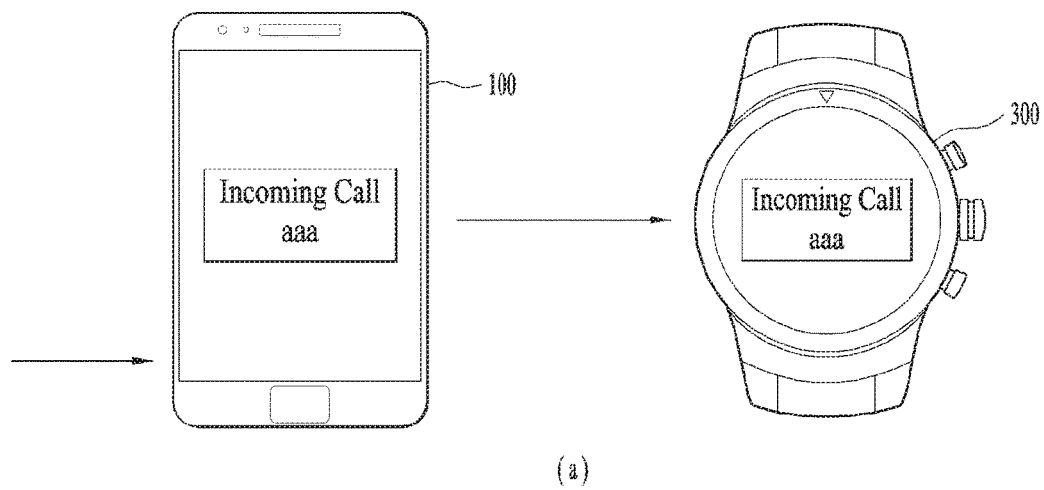
(a)
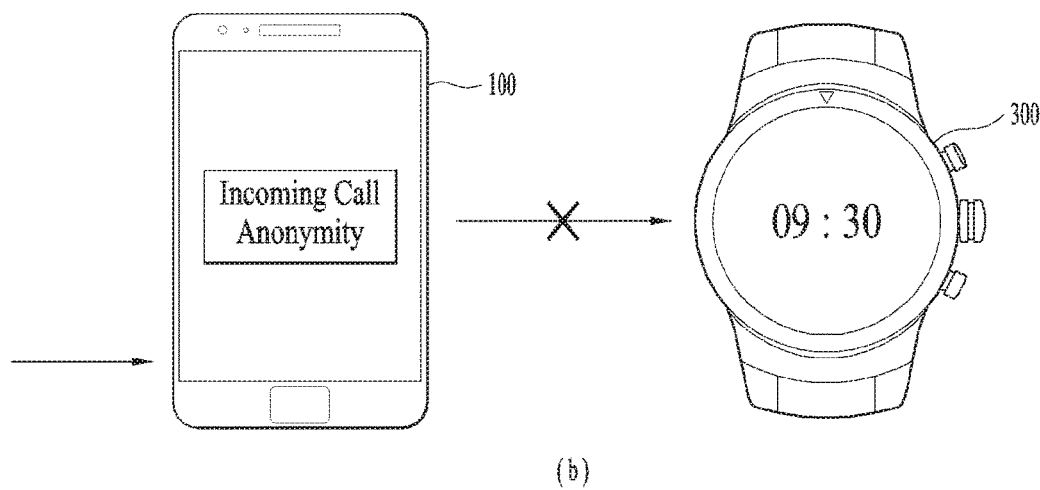
(b)

FIG. 19
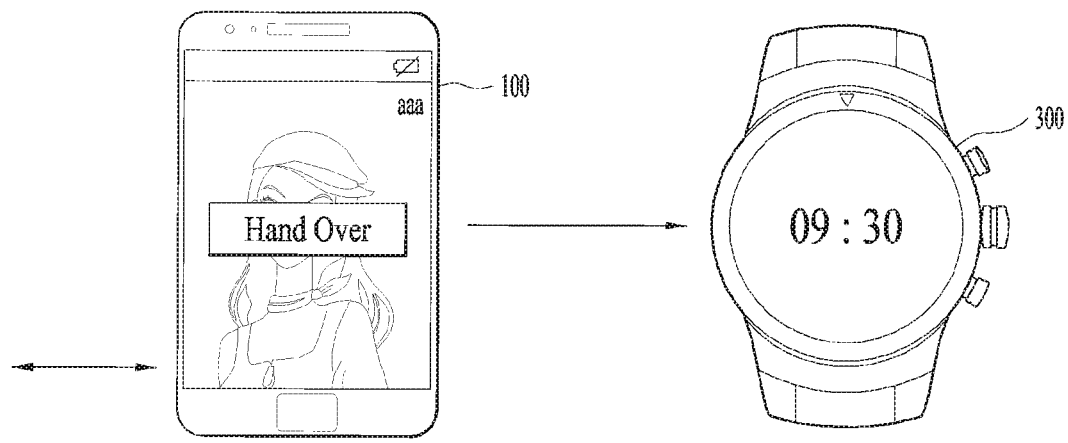
(a)
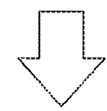
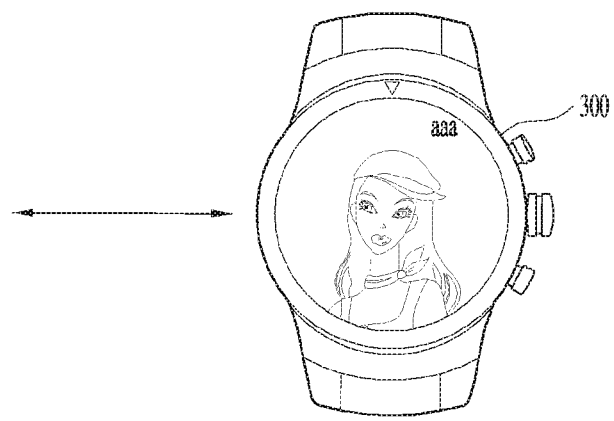
(b)

FIG. 20
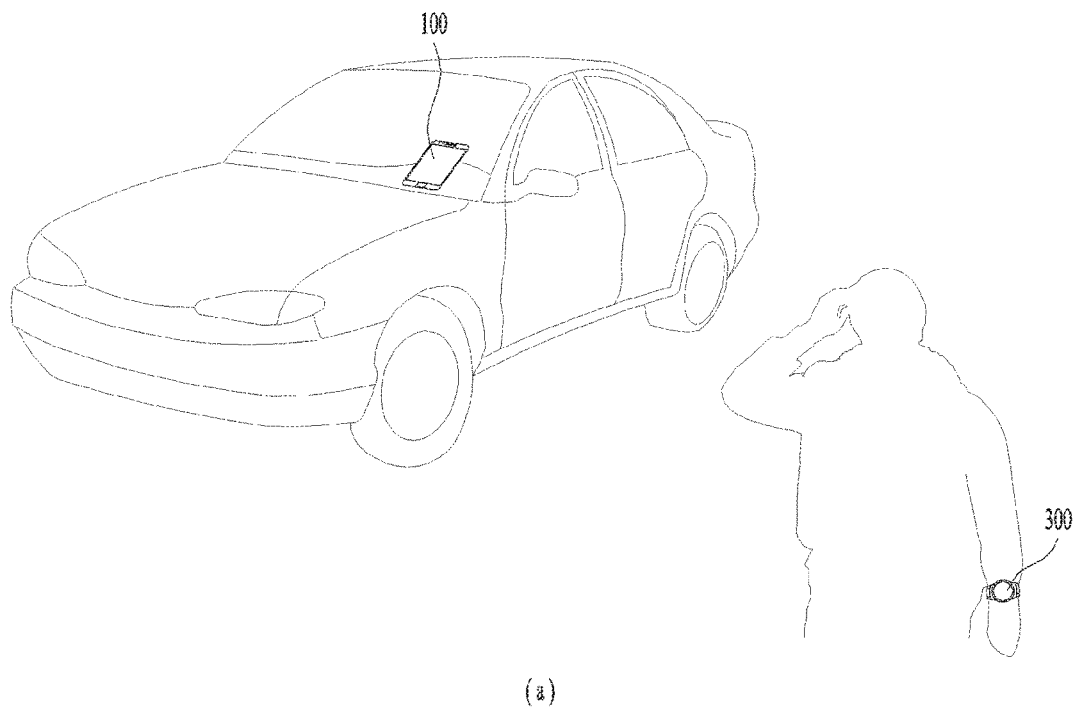
(a)
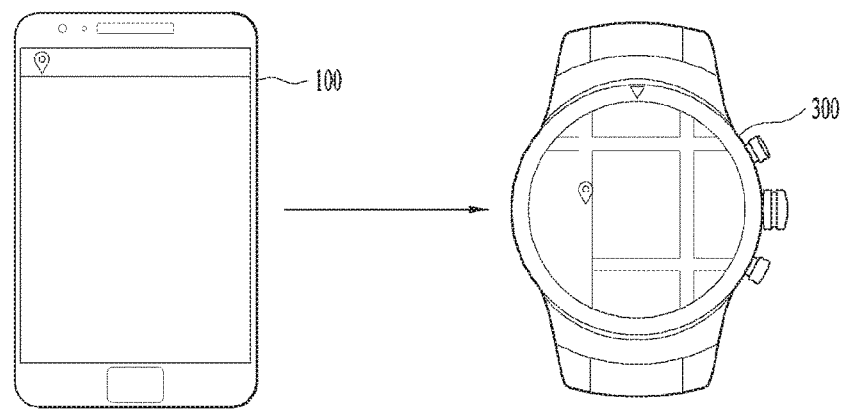
(b)

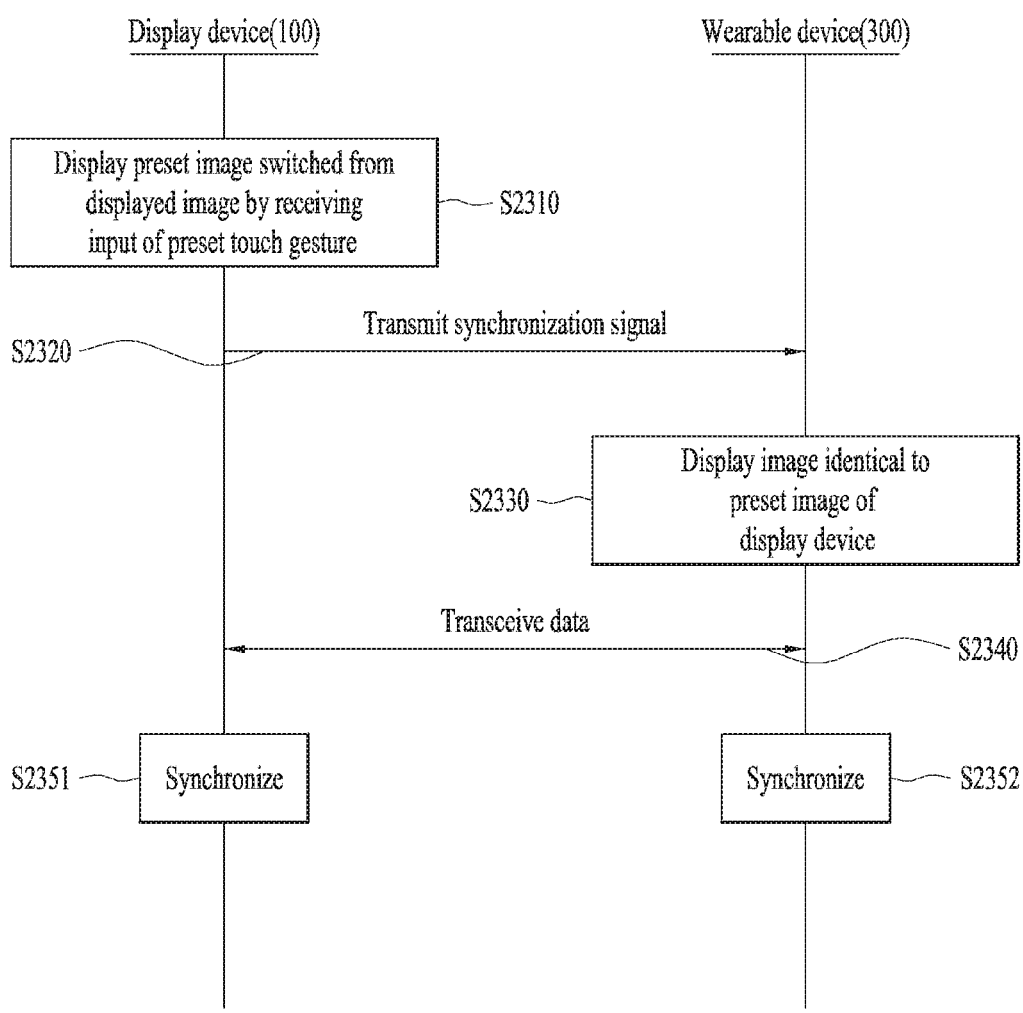

SYNCHRONIZATION SYSTEM COMPRISING DISPLAY DEVICE AND WEARABLE DEVICE, AND CONTROLLING METHOD

CROSS-REFERENCE TO RELATED APPLICATIONS

This application is the National Stage filing under 35 U.S.C. 371 of International Application No. PCT/KR2015/005380, filed on May 28, 2015, which claims the benefit of earlier filing date and right of priority to Korean Application No. 10-2015-0052478, filed on Apr. 14, 2015, the contents of which are all hereby incorporated by reference herein in their entirety.

TECHNICAL FIELD

The present invention relates to a synchronizing system, and more particularly, to a synchronizing system having a display device and a wearable device and controlling method thereof.

BACKGROUND ART

Generally, terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and recording a video through a camera, a function of audio recording, a function of music file play through a speaker system, a function of outputting image or video through a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example.

To support and increase the terminal functions, it may be able to consider the improvement of structural parts and/or software parts of the terminal.

Meanwhile, as various types of terminals have been developed, a single user tends to own a plurality of terminals. However, as a plurality of the terminals include common functions, a user may want a single adjacent terminal to perform a necessary function only depending on a situation. Thus, the demand for a technology capable of facilitating functions to be switched between terminals and also facilitating data to be synchronized between terminals is increasingly rising.

DISCLOSURE OF THE INVENTION

Technical Tasks

Accordingly, the present invention is directed to a synchronizing system having a display device and a wearable device and controlling method thereof that substantially obviate one or more of the problems due to limitations and disadvantages of the related art.

One object of the present invention is to provide a synchronizing system having a display device and a wearable device and controlling method thereof, by which inter-terminal synchronization can be performed fast and recognized intuitively.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solution

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a synchronization system according to one embodiment of the present invention includes a display device switching a displayed background image to a preset image by receiving an input of a preset touch gesture, the display device displaying the preset image, the display device transmitting a synchronization signal to a wearable device and the wearable device displaying an image identical to the preset image of the display device if receiving the synchronization signal from the display device, the wearable device synchronizing data with the display device.

Preferably, when the wearable device is synchronized with the display device in advance, if the display device approaches in a preset distance, the wearable device may transmit a background image of the wearable device to the display device and receives a background image of the display device.

More preferably, the preset image may include the background image of the wearable device received by the display device.

To further achieve these and other advantages and in accordance with the purpose of the present invention, as embodied and broadly described, a display device according to another embodiment of the present invention may include a communication unit configured to communicate with an external terminal, a display unit switching a displayed background image to a preset image by receiving an input of a preset touch gesture, the display device displaying the preset image, and a control unit controlling the communication unit to transmit a synchronization signal to the external terminal if the displayed background image is switched to the preset image.

Preferably, wherein the preset touch gesture may include one of a long touch gesture, a two-finger touch gesture, a knock touch gesture, and a flicking touch gesture.

More preferably, the flick touch gesture may include a touch to at least one of a preset edge region of the display unit and a bottom region of the display unit.

Preferably, if a plurality of external terminals exist, a plurality of preset images may exist and each of a plurality of the preset images may be mapped to at least one external terminal to be synchronized.

More preferably, the control unit may control the display unit to display a plurality of the preset images sequentially in response to the input of the preset touch gesture.

Preferably, the control unit may perform synchronization by transmitting data of the display device to the external terminal and receiving data of the external terminal.

More preferably, the control unit may control the display unit to display the data of the synchronized external terminal by setting a preset attribute for the data of the synchronized external terminal to be distinguished from the data of the display device.

In this case, the preset attribute may include at least one of a transparency, a color, a font, and a thickness.

Preferably, if getting away from the synchronized external terminal over a preset distance, the control unit may automatically activate a GPS and transmits a location information to the external terminal.

To further achieve these and other advantages and in accordance with the purpose of the present invention, as embodied and broadly described, a wearable device according to another embodiment of the present invention may include a display unit, a communication unit configured to receive a synchronization signal from an external terminal, and a control unit, if receiving the synchronization signal, controlling the display unit to display an image identical to a preset image of the external terminal, the control unit controls the communication unit to transmit data of the wearable device to the external device, the control unit controls the communication unit to receive data from the external terminal.

Preferably, the control unit may control the display unit to display the data of the synchronized external terminal by setting a preset attribute for the data of the synchronized external terminal to be distinguished from the data of the wearable.

More preferably, the preset attribute may include at least one of a transparency, a color, a font, and a thickness.

Preferably, if a location information is received from the synchronized external terminal, the control unit may display the location information of the external terminal.

To further achieve these and other advantages and in accordance with the purpose of the present invention, as embodied and broadly described, a method of controlling a synchronizing system according to further embodiment of the present invention may include the steps of switching a displayed background image to a preset image in a display device having received an input of a preset touch gesture, displaying the preset image in the display device, transmitting a synchronization signal to a wearable device from the display device, displaying an image identical to the preset image of the display device in the wearable device if receiving the synchronization signal from the display device, and synchronizing data with the display device in the wearable device.

Preferably, when the wearable device is synchronized with the display device in advance, if the display device approaches in a preset distance, the wearable device may transmit a background image of the wearable device to the display device and may receive a background image of the display device.

More preferably, the preset image may include the background image of the wearable device received by the display device.

It is to be understood that both the foregoing general description and the following detailed description are exemplary and explanatory and are intended to provide further explanation of the invention as claimed.

Advantageous Effects

Accordingly, the present invention provides the following effects and/or features.

First of all, according to one embodiment of the present invention, it is advantageous in that synchronization with one terminal is facilitated using another terminal.

Secondly, it is advantageous in that a presence or non-presence of synchronization can be intuitively recognized.

Thirdly, although a plurality of terminals exist, it is advantageous in that a terminal to be synchronized can be conveniently selected.

Fourthly, it is advantageous in recognizing whether a synchronized data is another device data.

Fifthly, it is advantageous in that a phone call received by one terminal can be forwarded to another synchronized device.

Finally, it is advantageous in that a location information can be transmitted to a synchronized terminal in case of being spaced over a predetermined distance.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. The above and other aspects, features, and advantages of the present invention will become more apparent upon consideration of the following description of preferred embodiments, taken in conjunction with the accompanying drawing figures.

In the drawings:

FIG. 10 is a diagram to describe one embodiment for a wearable device to be synchronized with a display device;

FIG. 18 is a diagram for one embodiment of a function of forwarding a received call;

FIG. 19 is a diagram to describe one embodiment for a display device to hand over an incoming call to a wearable device;

FIG. 20 is a diagram to describe one embodiment for a display device and a wearable device to transceive location information;

FIG. 23 is a timing diagram for a method of controlling a synchronizing system according to one embodiment of the present invention.

BEST MODE

Mode for Invention

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
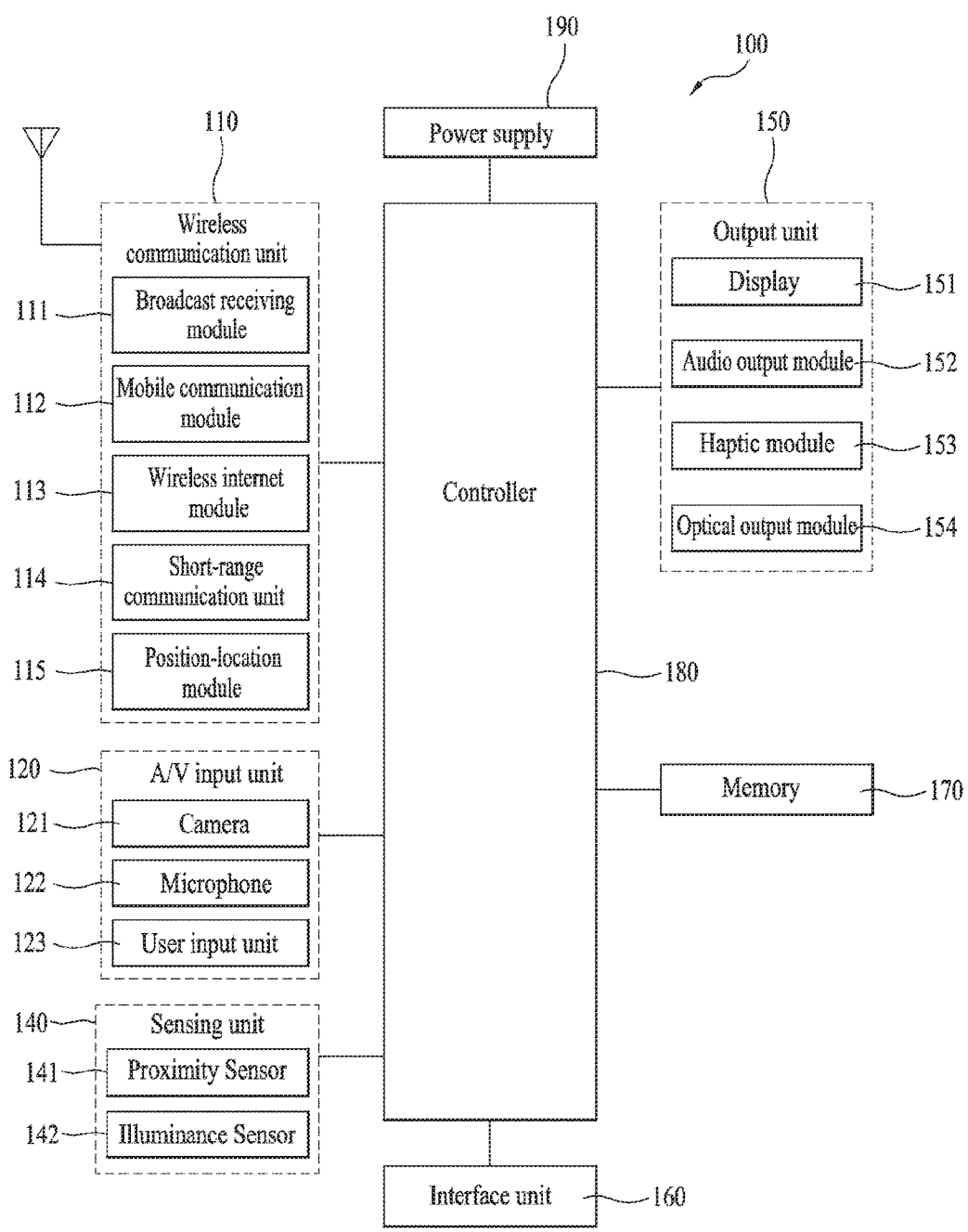
FIG. 1A is a block diagram to describe a mobile terminal related to the present invention.
Figure 1B:
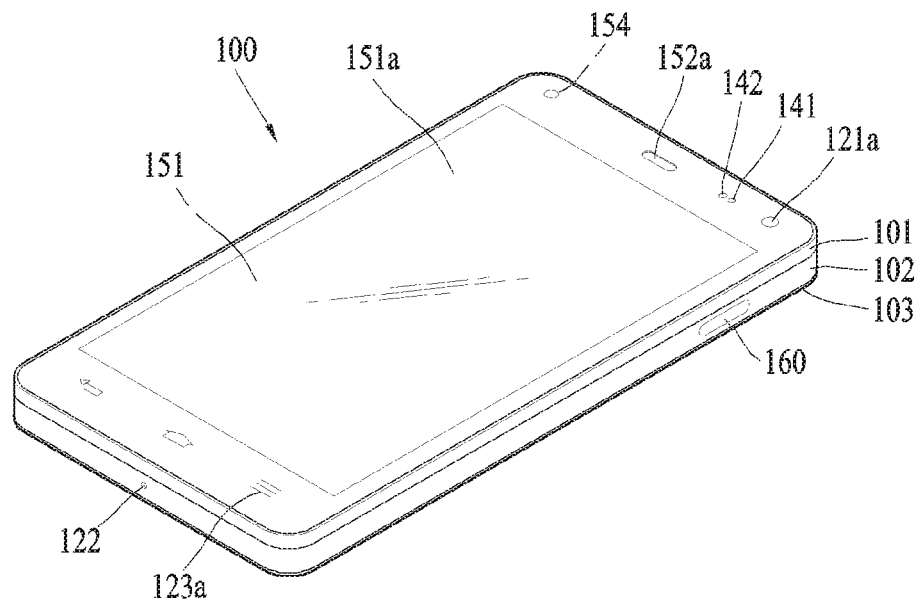
FIG. 1B and FIG. 1C are conceptional diagrams if a mobile terminal related to the present invention in different views.
Figure 1C:
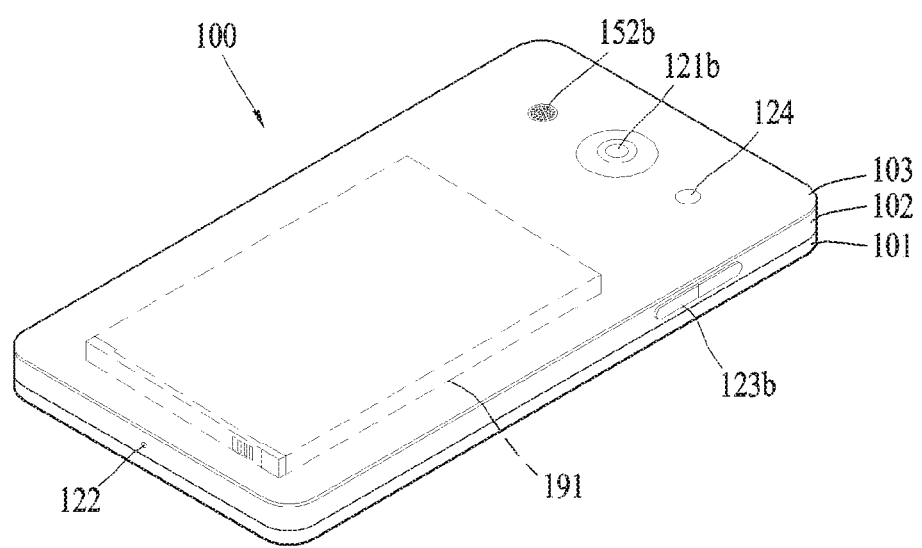

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can process or provide appropriate information or function to a user by processing signals, data, informations and the like inputted or outputted through the above-mentioned components or running application programs saved in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the above-mentioned components can cooperatively operate to embody operations, controls or controlling methods of the mobile terminal according to various embodiments mentioned in the following description. And, the operations, controls or controlling methods of the mobile terminal can be embodied on the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1$^{st}$ audio output unit 152a, the 2$^{nd}$ audio output unit 152b, the proximity sensor 141, the illumination sensor 142, the light output unit 154, the 1$^{st}$ camera 121a, the 2$^{nd}$ camera 121b, the 1$^{st}$ manipulating unit 123a, the 2$^{nd}$ manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
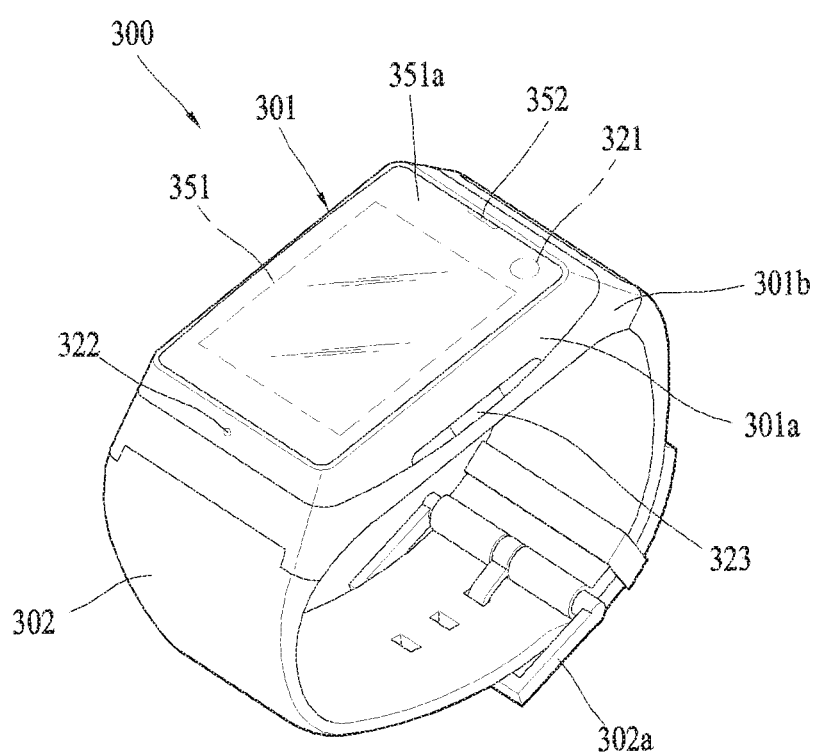
FIG. 2 is a perspective diagram of a mobile terminal of a watch type related to another embodiment of the present invention.

FIG. 2 is a perspective view illustrating one example of a watch-type mobile terminal 300 in accordance with another exemplary embodiment.

As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Further preferred embodiments will be described in more detail with reference to additional drawing figures. It is understood by those skilled in the art that the present features can be embodied in several forms without departing from the characteristics thereof.

Figure 3:
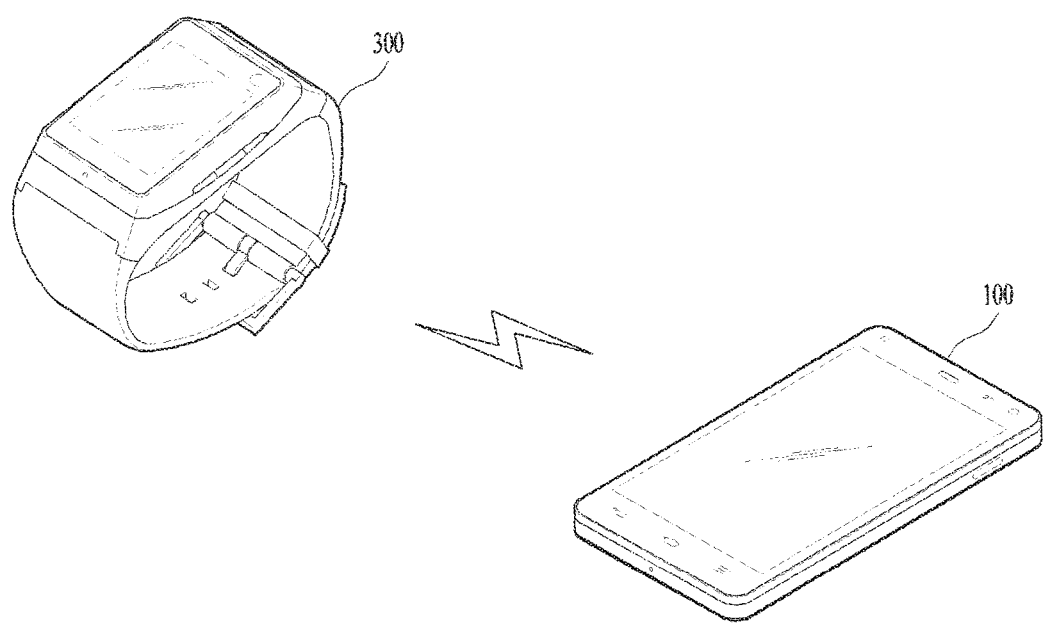
FIG. 3 is a diagram to describe a synchronizing system according to one embodiment of the present invention.

FIG. 3 is a diagram to describe a synchronizing system according to one embodiment of the present invention.

Referring to FIG. 3, a display device 100 and a wearable device 300 are illustrated. A synchronizing system may include the display device 100 and the wearable device 300. The display device 100 may perform a synchronizing process with the wearable device 300. The wearable device 300 may perform a synchronizing process with the display device 100 as well.

For instance, a user may use the display device 100 while not wearing the wearable device 300. The user may desire to check a phone call, a message, or the like, which is received by the wearable device 300, through the display device 100. The user may synchronize the display device 100 with the wearable device 300. The wearable device 300 may send data to the display device 100. The user may wear the wearable device 300 while not using the display device 100. The user may desire to check a phone call, a message, or the like, which is received by the display device 100, through the wearable device 300. The user may synchronize the wearable device 300 with the display device 100. The display device 100 may send data to the wearable device 300. Thus, the display 100 can be synchronized with the wearable device 300 by playing a role as a host. The wearable device 300 can be also synchronized with the display device 100 by playing a role as a host.

The following description is made centering on a process for the display device 100 to be synchronized with the wearable device 300. First of all, the display device 100 may receive an input of a synchronization command for synchronization with the wearable device 300 from a user. For instance, the synchronization command may be set to one of various touch gestures. If receiving an input of a preset touch gesture, the display device 100 switches a displayed background image to a preset image and is able to transmit a synchronization signal to the wearable device 300. If receiving the synchronization signal from the display device 100, the wearable device 300 can display an image identical to the preset image. The wearable device 300 can be synchronized with the display device 100 by transceiving data with the display device 100. If the synchronization is complete, each of the display device 100 and the wearable device 300 can display the same preset image. In doing so, first of all, the display device 100 may display the preset image. The display device 100 may temporarily switch the background image to a temporary image or display a message 'synchronization in progress' during the synchronizing process. Once the synchronizing process is completed, each of the display device 100 and the wearable device 300 can display the same preset image. Each of the display device 100 and the wearable device 300 can store the preset image in advance.

Meanwhile, the display device 100 and the wearable device 300 may be paired with each other before the synchronization. In particular, the display device 100 and the wearable device 300 can be automatically paired with each other if they are located in a predetermined distance from each other after completion of an initial authenticating process. If the display device 100 and the wearable device 300 are paired with each other, they can transceive their background images with each other. If the user synchronizes the display device 100 with the wearable device 300, the aforementioned present image may include the received background image of the wearable device 300.

So far, the synchronizing system is described centering on the process for the display device 100 to be paired with the wearable device 300. Yet, as mentioned in the foregoing description, the synchronizing system can synchronize the wearable device 300 with the display device 100 as well. If the display device 100 and the wearable device 300 are paired with each other in advance and if a user synchronizes the wearable device 300 with the display device 100, a preset image may include a received background image of the display device 100. A detailed embodiment of a synchronizing system is described as follows.

Figure 4:
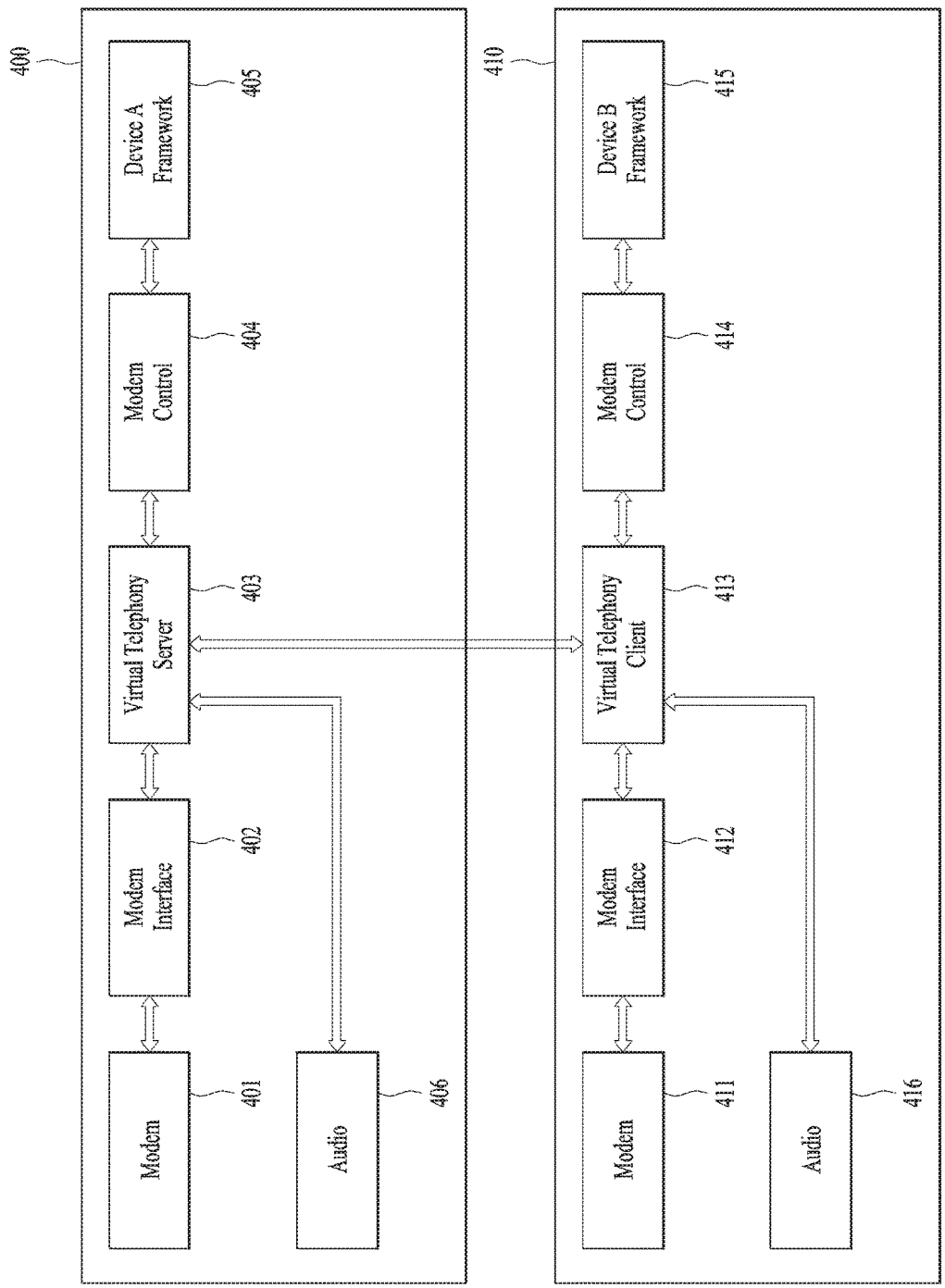
FIG. 4 is a diagram to describe a system including a display device and a wearable device according to one embodiment of the present invention.

FIG. 4 is a diagram to describe a system including a display device and a wearable device according to one embodiment of the present invention.

Referring to FIG. 4, a display device 400 may include a modem 401, a modem interface 402, a VT (virtual telephony) server 403, a modem control 404, a framework 405, an audio module 406 and the like. A wearable device 410 may include a modem 411, a modem interface 412, a VT (virtual telephony) server 413, a modem control 414, a framework 415, an audio module 416 and the like.

Particularly, according to the present invention, unlike the related art, the modules shown in FIG. 4 can be designed not through an application layer but through a kernel or middle layer entirely or in part. Hence, it is advantageously unnecessary for a design of an existing Android application to be modified. Moreover, compared to an application layer based TV service, the present invention costs less maintenance fees to have technical effects further improved than those of the related art.

If the display device 400 and the wearable device 410 are synchronized with each other, the wearable device 410 can forward a received phone call, a received message and the like to the display device 400. Likewise, the display device 400 can forward a received phone call, a received message and the like to the wearable device 410. For instance, as a device of performing a synchronizing function becomes a host device, a signal received by another device can be forwarded to the host device. Alternatively, it is able to determine a host device in accordance with a user's setting. A function of synchronization between two devices is generally performed between one device including a modem and a user identity module (e.g., USIM) and another device failing to include a modem or a user identity module. Yet, an embodiment of performing a synchronizing function among a plurality of devices, each of which includes a modem and a user identity module is described in the present specification. One embodiment of the present invention is described in detail with reference to the accompanying drawings as follows.

Figure 5:
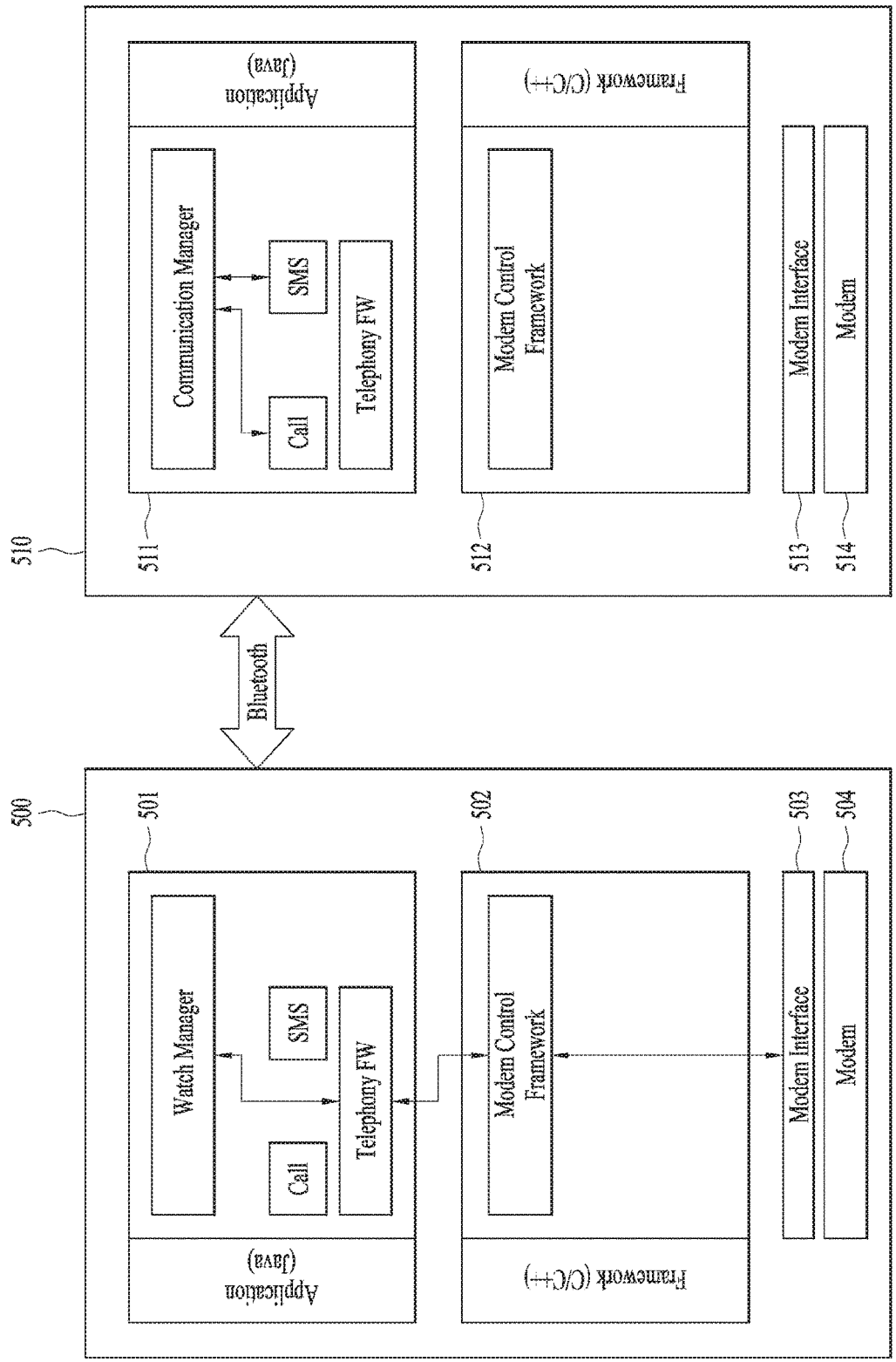
FIG. 5 is a diagram to describe a system including a display device and a wearable device according to another embodiment of the present invention.

FIG. 5 is a diagram to describe a system including a display device and a wearable device according to another embodiment of the present invention.

In FIG. 5, a display device 500 and a wearable device 510 can be designed to enable a VT (virtual telephony) service to be performed through an application layer.

For instance, referring to FIG. 5, a VT service can be performed through Bluetooth communication between an application layer 501 of a display device 500 and an application layer 511 of a wearable device 510. The display device 500 includes a modem 504. And, the modem 504 may transceive data with a framework 502 through a modem interface 503.

Likewise, a VT service can be performed through Bluetooth communication between an application layer 511 of a wearable device 510 and an application layer 501 of a display device 500. The wearable device 510 includes a modem 514. And, the modem 514 may transceive data with a framework 512 through a modem interface 513.

Figure 6:
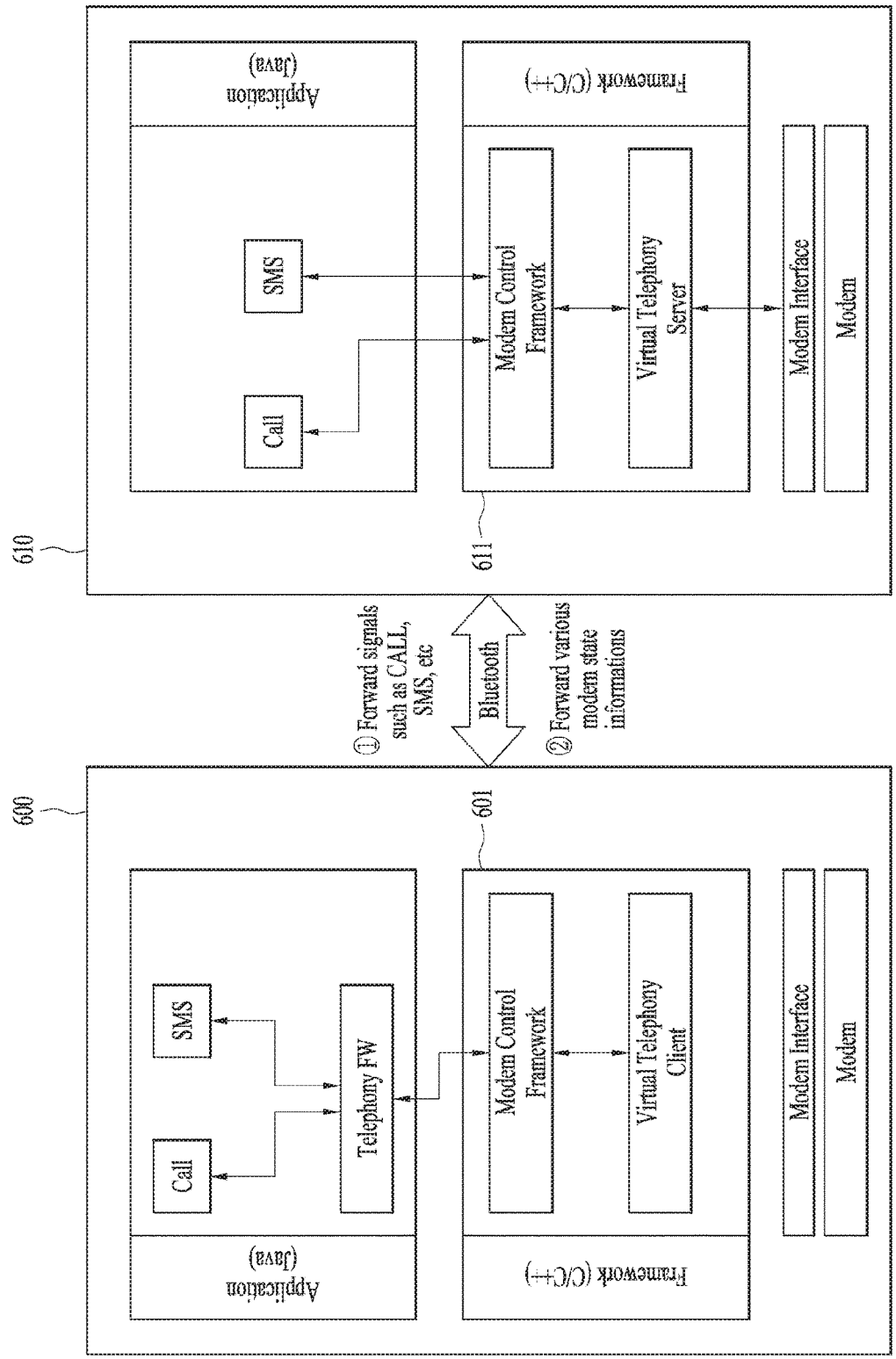
FIG. 6 is a schematic diagram of modules necessary for a display device and a wearable device to provide a virtual telephony service according to one embodiment of the present invention.

FIG. 6 is a schematic diagram of modules necessary for a display device and a wearable device to provide a virtual telephony service according to one embodiment of the present invention.

According to one embodiment shown in FIG. 6, it is able to embody a VT service based on a framework or middleware. Hence, it is possible to embody a VT service using such a wireless communication technology as Wi-Fi or the like as well as Bluetooth.

FIG. 6 can be designed to enable a data communication for a VT service not on an application layer but on a framework level. Hence, referring to FIG. 6, a framework 601 of a display device 600 may additionally include a VT client. And, a framework 611 of a wearable device 610 may additionally include a VT server.

Moreover, it is designed to enable data transmission/reception to be performed on a framework or middleware, the brings a technical effect that various informations related to states of a modem can be transceived as well as call signals and SMS related signals.

A block diagram of a terminal is described in detail as follows.

Figure 7:
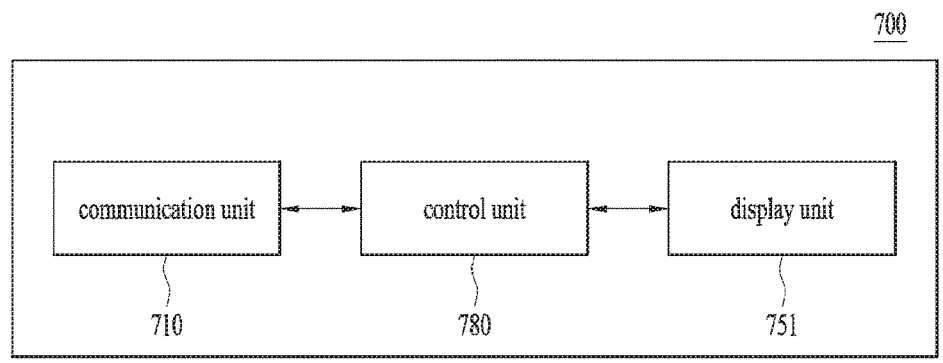
FIG. 7 is a block diagram of a terminal according to one embodiment of the present invention.

FIG. 7 is a block diagram of a terminal according to one embodiment of the present invention.

Referring to FIG. 7, a terminal 700 may include a communication unit 710, a control unit 780, and a display unit 751. Each of a display device and a wearable device may belong to a prescribed type of the terminal 700. In particular, the terminal 700 configured to display contents by including a display unit may be a display device. The terminal 700 wearable on a user's body may be a wearable device. Hence, the terminal 700 wearable on a user's body by including a display unit may become a wearable device as well as a display device. In particular, the display device and the wearable device are distinguished from each other for clarity of the description only. And, each of the display device and the wearable device may belong to the terminal 700.

In case that the terminal 700 is the display device, the communication unit 710 can perform a communication with the wearable device. The communication unit 710 can transmit a synchronization signal to the wearable device. If the synchronization is complete, the communication unit 710 can transceive data with the wearable device. The display unit 751 may include a touch sensor capable of recognizing a touch gesture. The display unit 751 receives an input of a preset touch gesture, switches a displayed background image to a preset image, and is then able to display the preset image. For instance, the preset touch gesture may include a knock gesture of inconsecutively applying a touch in accordance with a preset pattern, a two-finger touch gesture of applying a touch with two fingers simultaneously and then moving the touch, a long touch gesture of applying a touch over a preset time, or a flicking touch gesture of moving a touch from a specific point to another point continuously by maintaining the touch.

If the displayed background image is switched to the preset image, the control unit 780 can control the communication unit 780 to transmit a synchronization signal to the wearable device. The control unit 780 can perform a matched function in response to a touch input. Meanwhile, the control unit 780 can control the display unit 751 to display the preset image after completion of the synchronization. For instance, the control unit 780 can display the preset image in response to a synchronization command. Yet, while the synchronization with the wearable device is performed, the control unit 780 may display a previously displayed background image instead of the preset image. The control unit 780 may control a notification screen (e.g., 'synchronization in progress') to be outputted in a manner of overlapping the preset image. If it is determined that the synchronization with the wearable device is completed, the control unit 780 is able to output the preset image finally. In doing so, the preset image may be displayed on each of the display device and the wearable device simultaneously.

Before the synchronization is performed, the display device may be paired with the wearable device. The control unit 780 may be able to search whether a registered wearable device exists in a preset distance. If the registered wearable device is found, the control unit 780 can connect the registered wearable device. The control unit 780 transmits a background image of the display device to the wearable device and is able to receive a background image of the wearable device. Hence, a preset image for synchronization may include the received background image of the wearable device.

As mentioned in the foregoing description, the terminal 700 may include a wearable device. If the terminal 700 is the wearable device, the communication unit 710 can perform a communication with the display device. The communication unit 710 may include a synchronization signal from the display device. The display unit 751 may include a touch sensor capable of recognizing a touch gesture. After the synchronizing process has been performed, the display unit 751 can display the same image of a preset image of the display device. The synchronizing process and the step of displaying the preset image may be performed simultaneously or sequentially.

If the synchronization signal is received, the control unit 780 can control the display unit 751 to display the same image of the preset image of the display device. The control unit 780 can control the communication unit 710 to transmit data of the wearable device to the display device and to receive data from the display device. The synchronization may mean a process for transceiving data in a manner that a display device and a wearable device are connected to each other. Each of the display device and the wearable device may display the same preset image when the synchronization signal is transceived. Each of the display device and the wearable device may display the same preset image when the synchronizing process is completed.

According to the embodiment described with reference to FIG. 7, the synchronizing process is performed in a manner that the display device transmits the synchronization signal to the wearable device. On the other hand, as mentioned in the foregoing description, a synchronizing process may be performed in a manner that a wearable device transmits a synchronization signal to a display device.

A detailed embodiment for a display device and a wearable device to display the same preset image is described with reference to the accompanying drawing as follows.

Figure 8:
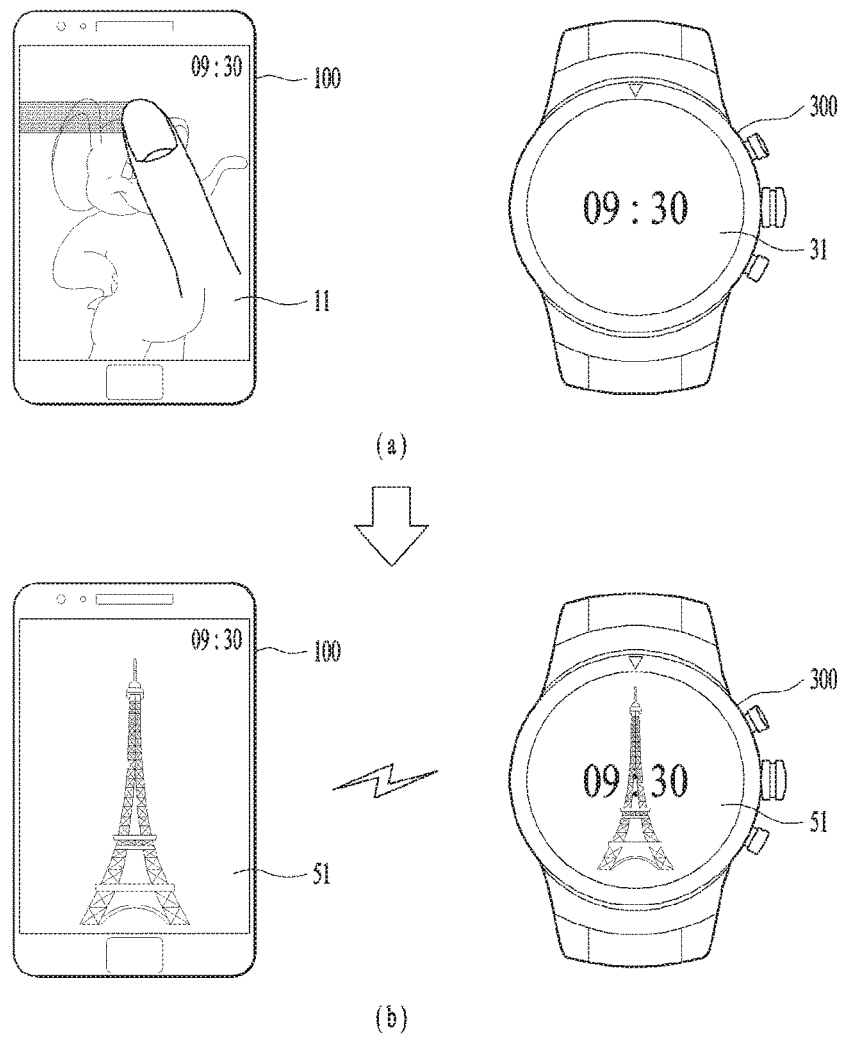
FIG. 8 is a diagram to describe one embodiment for a display device to synchronize a wearable device.

FIG. 8 is a diagram to describe one embodiment for a display device to synchronize a wearable device.

Referring to FIG. 8(*a*), a display device 100 and a wearable device 300 are illustrated. Each of the display device 100 and the wearable device 300 may include an individual modem and an individual user identity module. Hence, each of the display device 100 and the wearable device 300 can receive a phone call and a message independently. Each of the display device 100 and the wearable device 300 may display a different background image. In particular, the display device 100 can display a $1^{st}$ image 11, while the wearable device 300 can display a $2^{nd}$ image 31.

The display device 100 may receive an input of a preset touch gesture for synchronization with the wearable device 300. In FIG. 8(*a*), the display device 100 is receiving an input of a flicking touch gesture. The display device 100 can switch an image based on a moving direction of a touch gesture. The switched image may include a preset $3^{rd}$ image 51.

Referring to FIG. 8(*b*), the display device 100 and the wearable device 300, which are synchronized with each other, are illustrated. The display device 100 can transmit a synchronization signal to the wearable device 300. The wearable device 300 is able to perform a synchronizing process by transceiving necessary signals with the display device 100. If the synchronization is completed, the wearable device 300 can display the preset $3^{rd}$ image 51 identical to the image displayed on the display device 100. In some cases, if a synchronization signal is received from the display device 100, the wearable device 300 displays the $3^{rd}$ image 51 and may be then able to perform the synchronizing process.

As the display device 100 displays the same image of the wearable device 300 by receiving an input of a touch gesture, it is advantageous for a user to conveniently perform the synchronizing process and to recognize a presence or non-presence of the synchronization intuitively.

Meanwhile, the display device 100 and the wearable device 300 may be paired with other before the synchronization signal transmission. In case that the display device 100 and the wearable device 300 are paired with each other in advance, each of the display device 100 and the wearable device 300 can transmit its background image to the other device. For instance, the display device 100 may transmit a background image of the display device 100 to the wearable device 300, while the wearable device 300 may transmit a background image of the wearable device 300 to the display device 100. If the display device 100 receives an input of a touch gesture for synchronization, the display device 100 can display the received background image of the wearable device 300. And, the display device 100 is able to perform a process for synchronization with the wearable device 300.

A synchronization command may be mapped to one of various touch gestures. In the following description, various touch gestures for inputting synchronization commands are explained in detail with reference to the accompanying drawing.

Figure 9:
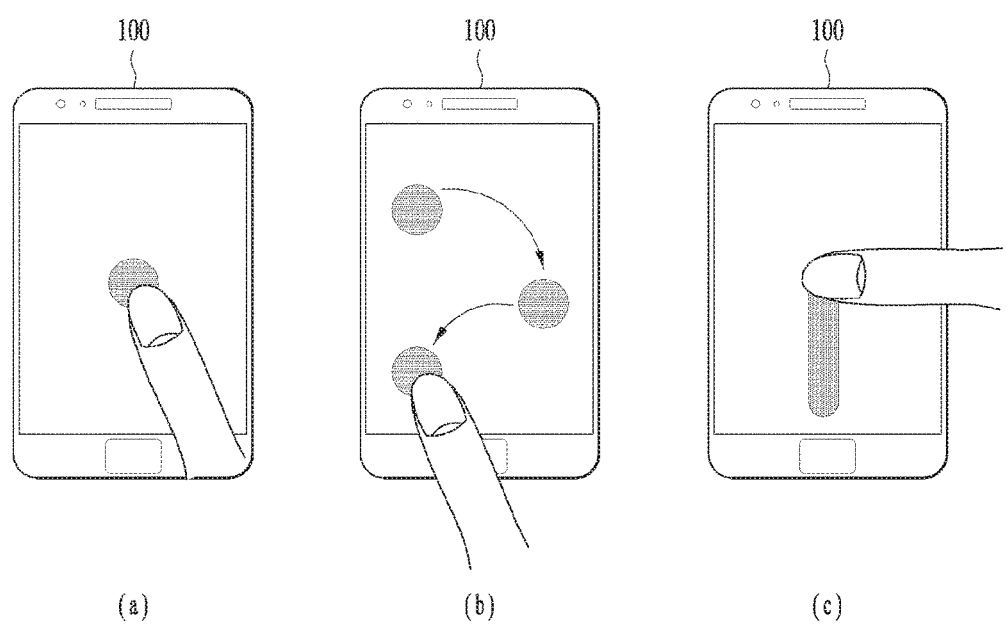
FIG. 9 is a diagram to describe various embodiments for inputting a synchronization command.

FIG. 9 is a diagram to describe various embodiments for inputting a synchronization command.

A preset touch gesture corresponding to a synchronization command may include one of a long touch gesture, a two-finger touch gesture, a knock touch gesture, and a flicking touch gesture.

Referring to FIG. 9(*a*), a long touch gesture is illustrated. In particular, the long touch gesture may mean a gesture of touching a random point of a display unit over a preset time.

Referring to FIG. 9(*b*), a knock touch gesture is illustrated. In particular, the knock touch gesture may mean a gesture of touching a display unit plural times in accordance with a preset pattern.

Referring to FIG. 9(*c*), a flicking touch gesture is illustrated. In particular, the flicking touch gesture may mean a gesture applied in a manner of applying a touch to a preset point and then moving the touch by having the touch maintained. Moreover, the flicking touch gesture may mean a gesture similar to a drag touch gesture or a touch and holding gesture.

The flicking touch gesture may include a touch to a preset edge region and a bottom region of a display unit. In particular, a flicking touch gesture corresponding to a synchronization command may include a gesture of applying a touch to an edge region of a display unit and then moving the touch. The flicking touch gesture may mean a gesture of applying a touch to a random region of a display unit and then moving the touch to a top region of the display unit. If the display device 100 receives an input of a flicking touch gesture, the display device 100 can switch an image in a moving direction of the touch gesture.

Meanwhile, the display device 100 may receive an input of a two-finger touch gesture. The two-finger may mean a gesture of touching two random points of a display unit simultaneously or a gesture of touching two random points simultaneously and then moving the touch by having the touch maintained.

So far, one embodiment for the display device 100 to be synchronized with the wearable device by receiving an input of a touch gesture is described. Alternatively, the wearable device may be synchronized with the display device 100 by receiving an input of a touch gesture as well.

FIG. 10 is a diagram to describe one embodiment for a wearable device to be synchronized with a display device.

Referring to FIG. 10(*a*), a wearable device 300 and a display device 100 are illustrated. Each of the wearable device 300 and the display device 100 may include an individual modem and an individual user identity module. Hence, each of the display device 100 and the wearable device 300 can receive a phone call and a message independently. Each of the display device 100 and the wearable device 300 may display a different background image. For instance, the wearable device 300 may display an analog watch image 32 and display device 100 may display a scenery image 12.

The wearable device 300 may receive an input of a preset touch gesture for synchronization with the display device 100. In FIG. 10(a), the wearable device 300 is receiving an input of a flicking touch gesture. The wearable device 300 can switch the analog watch image 32 to a $3^{rd}$ image 52 that means the synchronization.

Referring to FIG. 10(b), the display device 100 and the wearable device 300, which are synchronized with each other, are illustrated. The wearable device 300 can transmit a synchronization signal to the display device 100. The display device 100 is able to perform the synchronization by transceiving necessary signals with the wearable device 300. In particular, each of the display device 100 and the wearable device 300 can display the same $3^{rd}$ image 52. When the display device 100 receives the synchronization signal from the wearable device 300, the display device 100 may be switched to the $3^{rd}$ image 52. After the completion of the synchronization, the display device 100 may be switched to the $3^{rd}$ image 52.

Meanwhile, the wearable device 300 and the display device 100 may be paired with other before the synchronization signal transmission. In case that the wearable device 300 and the display device 100 are paired with each other in advance, each of the wearable device 300 and the display device 100 can transmit its background image to the other device. For instance, the wearable device 300 may transmit a background image of the wearable device 300 to the display device 100, while the display device 100 may transmit a background image of the display device 100 to the wearable device 300. If the wearable device 300 receives an input of a touch gesture for synchronization, the wearable device 300 can display the received background image of the display device 100. And, the wearable device 300 is able to perform a process for synchronization with the display device 100.

Figure 11:
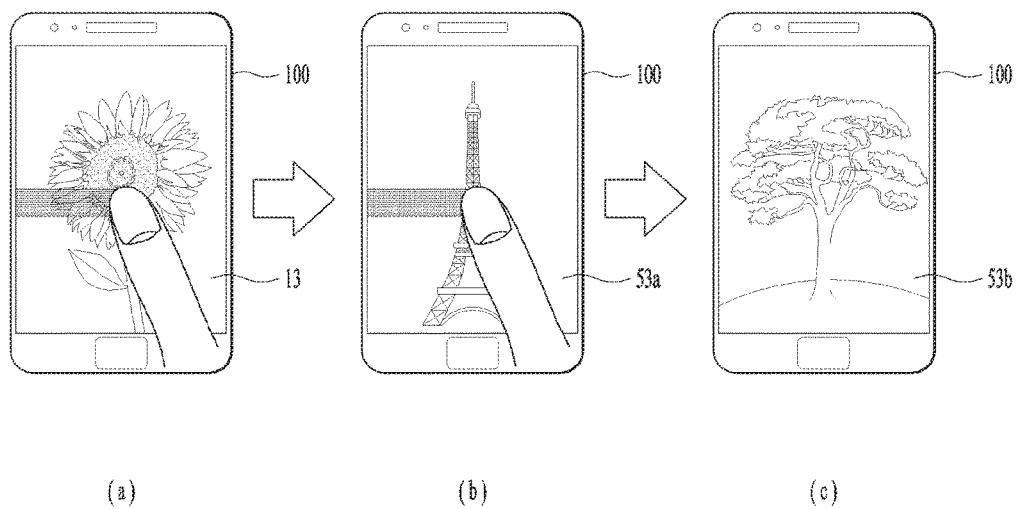
FIG. 11 is a diagram to describe one embodiment that a plurality of synchronizable terminals exist.

FIG. 11 is a diagram to describe one embodiment that a plurality of synchronizable terminals exist.

A display device 100 may include a plurality of images to be synchronized with an external terminal. For instance, the display device 100 may include a $1^{st}$ image to be synchronized a $1^{st}$ terminal, a $2^{nd}$ image to be synchronized with a $2^{nd}$ terminal, and a $3^{rd}$ image to be synchronized with the $1^{st}$ terminal and the $2^{nd}$ terminal. A synchronized image included by the display device 100 may be set by a user. Moreover, the display device 100 may store a plurality of images for synchronization in advance. And, the display device 100 can map each of a plurality of the stored synchronized images one by one depending on the number and type of the synchronizable external terminals.

Referring to FIG. 11(a), the display device 100 is displaying a background image 13. In this case, the background image is a general image not related to the synchronization. The display device 100 may receive an input of a touch gesture corresponding to a synchronization command. The display device 100 may be switched to a synchronized image based on a direction of the touch gesture. In some cases, the display device 100 may be switched to the synchronized image in a preset manner. For instance, the preset manner may include a manner of moving from a left side to a right side, a manner of being switched irrespective of a direction, or the like.

Referring to FIG. 11(b), the display device 100 switched to a preset $1^{st}$ image 53a corresponding to a synchronization command is illustrated. If there is a single image corresponding to the synchronization command, when the display device 100 is switched to a $1^{st}$ image 53a, the display device 100 can transmit a synchronization command to an external terminal. Yet, if a plurality of images corresponding to the synchronization command exist, although the display device 100 is switched to the $1^{st}$ image 53a, the display device 100 can stand by for a preset time. After the display device 100 has been switched to the $1^{st}$ image 53a, if there is no other input over the preset time, the display device 100 is able to transmit a synchronization command to an external terminal mapped to the $1^{st}$ image 53a. Yet, the display device 100 may receive an input of a touch gesture corresponding to a synchronization command again. The display device 100 can be switched to another synchronized screen in response to the touch gesture input.

Referring to FIG. 11(c), the display unit 100 switched to a preset end image 53b corresponding to a synchronization command is illustrated. Although the display device 100 is switched to the $2^{nd}$ image 53b, the display device 100 can stand by for a preset time. After the display device 100 has been switched to the $2^{nd}$ image 53b, if there is no other input over the preset time, the display device 100 can transmit a synchronization command to an external terminal mapped to the $2^{nd}$ image 53b. For instance, the external terminal mapped to the $1^{st}$ image 53a may include a $1^{st}$ terminal and the external terminal mapped to the $2^{nd}$ image 53b may include a $2^{nd}$ terminal. Alternatively, the external terminal mapped to the $1^{st}$ image 53a may include the $1^{st}$ terminal and the external terminals mapped to the $2^{nd}$ image 53b may include the $1^{st}$ terminal and the $2^{nd}$ terminal.

In case of receiving an input of a touch gesture applied in a manner of moving in a direction opposite to that of the former touch gesture shown in FIG. 11, the display device 100 may be switched to the $1^{st}$ image 53a from the $2^{nd}$ image 53b or may be switched to the background image 13 from the $1^{st}$ image 53a.

Figure 12:
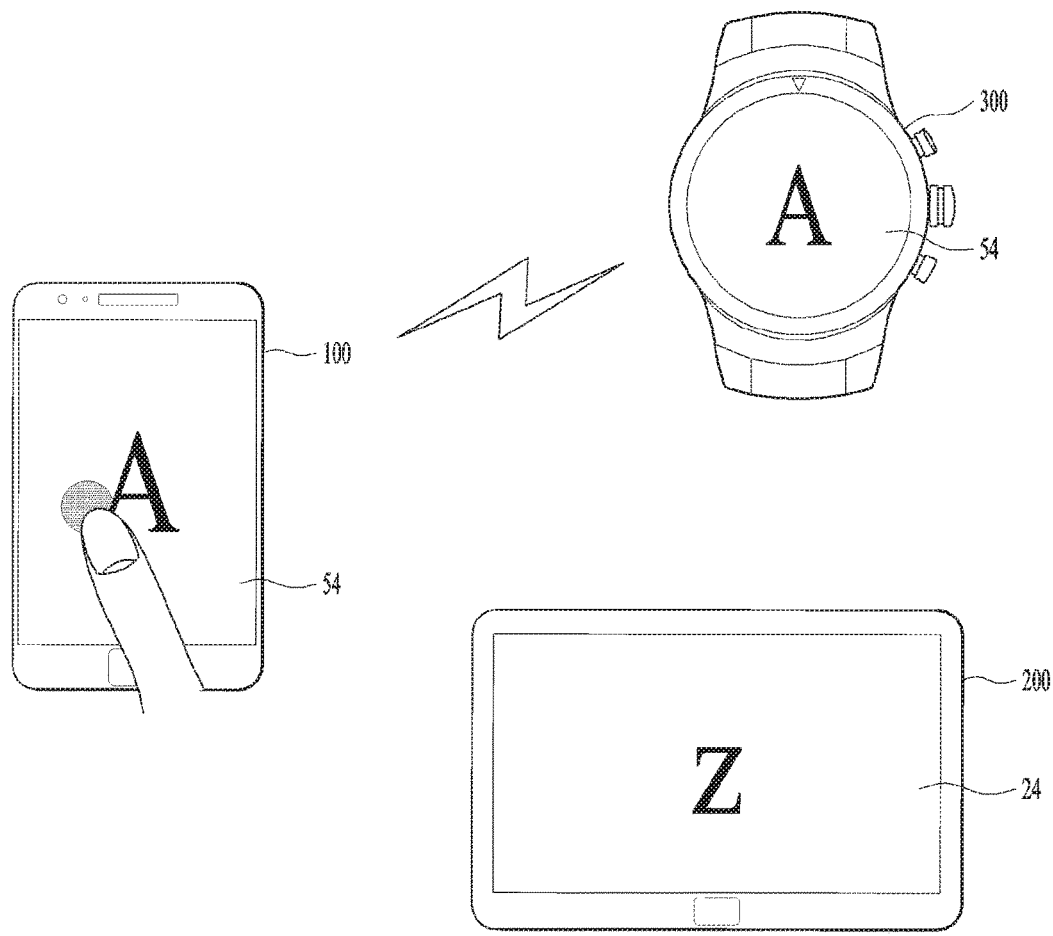
FIG. 12 is a diagram to describe one embodiment for a display device to be synchronized with one of a plurality of terminals.

FIG. 12 is a diagram to describe one embodiment for a display device to be synchronized with one of a plurality of terminals.

Referring to FIG. 12, a display device 100, a $1^{st}$ terminal 300 and a $2^{nd}$ terminal 200 are illustrated. First of all, the $1^{st}$ terminal 300 may include a wearable device and the $2^{nd}$ terminal 200 may belong to a prescribed type of a display device. Each of the display device 100, the $1^{st}$ terminal 300 and the $2^{nd}$ terminal 200 may display a different background image. For instance, the display device 100 may display an image x, the $1^{st}$ terminal 300 may display an image y, and the $2^{nd}$ terminal 200 may display an image z 24. The display device 100 may receive an input of a touch gesture corresponding to a synchronization command. As mentioned in the foregoing description, the display device 100 can recognize a long touch gesture, which is applied in a manner of applying a touch over a preset time, as the synchronization command.

According to one embodiment, in case that two synchronizable terminals exist, as shown in FIG. 12, there may exist a plurality of images indicating the synchronization. If receiving a touch input for a preset $1^{st}$ time, the display device 100 can display a $1^{st}$ image for synchronizing the $1^{st}$ terminal 300. As the display device 100 continues to receive the touch input, if a $2^{nd}$ time expires, the display device 100 can display a $2^{nd}$ image for synchronizing the $2^{nd}$ terminal 200. As the display device 100 continues to further receive the touch input after the $2^{nd}$ time, if a $3^{rd}$ time expires, the display device 100 can display a $3^{rd}$ image for synchronizing both of the $1^{st}$ terminal 300 and the $2^{nd}$ terminal 200 together.

In FIG. 12, the display device 100 can receive the touch input over the preset $1^{st}$ time. The display device 100 displays the image 54, which is the $1^{st}$ image, and is able to perform a process for the synchronization with the $1^{st}$ terminal 300. The $1^{st}$ terminal 300 is able to display the image A 54 like the display device 100. Since the image A 54 corresponding to the $1^{st}$ image is the image indicating the synchronization between the display device 100 and the $1^{st}$ terminal 300, the $2^{nd}$ terminal 200 can maintain the image z 24.

Figure 13:
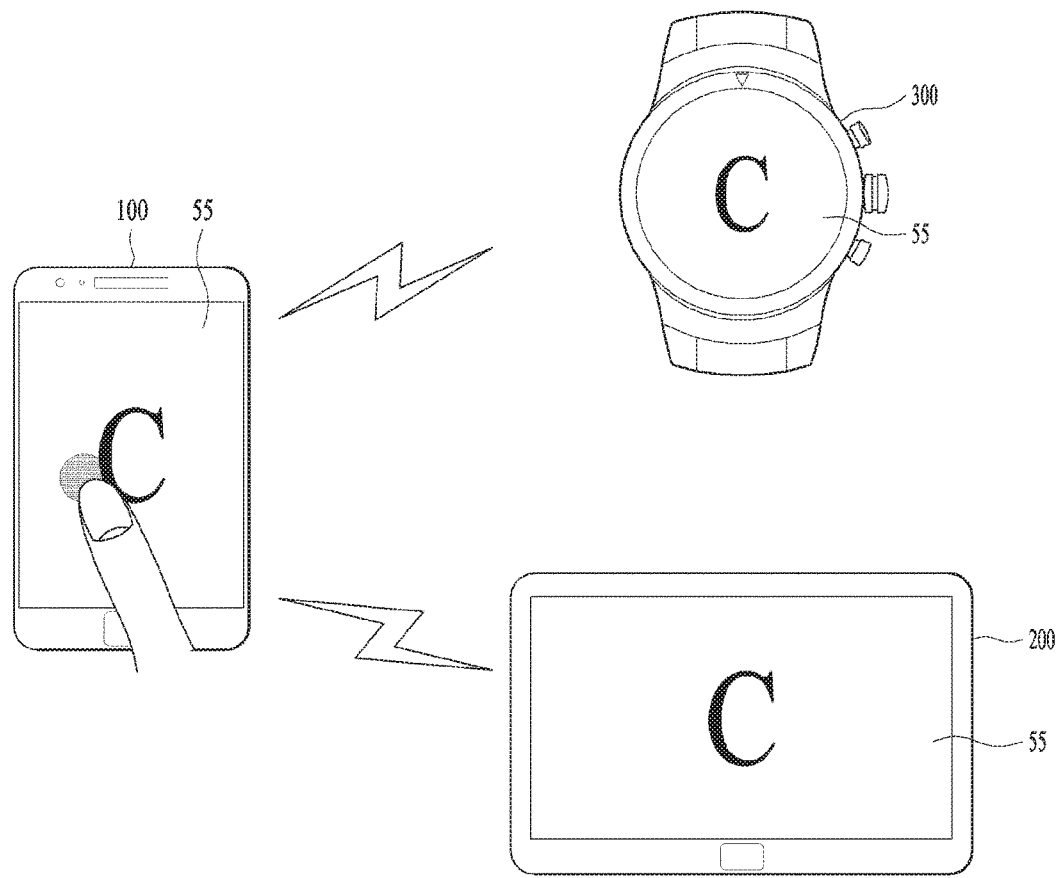
FIG. 13 is a diagram to describe one embodiment for a display device to be simultaneously synchronized with a plurality of terminals.

FIG. 13 is a diagram to describe one embodiment for a display device to be simultaneously synchronized with a plurality of terminals.

In FIG. 13, a $1^{st}$ terminal 300 synchronized with a display device 100 and a $2^{nd}$ terminal 200 synchronized with the display device 100 are illustrated. As mentioned in the foregoing description, the display device 100 may receive an input of a touch gesture corresponding to a synchronization command. When the touch gesture corresponding to the synchronization command is a long touch gesture, if a preset $1^{st}$ time expires, the display device 100 may display a $1^{st}$ image indicating the synchronization with the $1^{st}$ terminal 300. If a preset $2^{nd}$ time expires, the display device 100 may display a $2^{nd}$ image indicating the synchronization with the $2^{nd}$ terminal 200. If a preset $3^{rd}$ time expires, the display device 100 may display a $3^{rd}$ image indicating the synchronization with each of the $1^{st}$ terminal 300 and then $2^{nd}$ terminal 200.

The display device 100 displays an image indicating the synchronization. If a touch gesture is ended, the display device 100 can perform a synchronization process with a corresponding terminal.

Referring to FIG. 13, the display device 100 is outputting an image C 55 that is a $3^{rd}$ image. If a long touch gesture is ended, the display device 100 may transmit a synchronization signal to each of the $1^{st}$ terminal 300 and the $2^{nd}$ terminal 200. The display device 100 can complete the synchronizing process by transceiving data with each of the $1^{st}$ terminal 300 and the $2^{nd}$ terminal 200. Hence, a phone call and the like received by each of the $1^{st}$ terminal 300 and the $2^{nd}$ terminal 200 can be forwarded to the display device 100. Each of the display device 100, the $1^{st}$ terminal 300 and the $2^{nd}$ terminal 200 may display the image C indicating that they are synchronized with each other.

Figure 14:
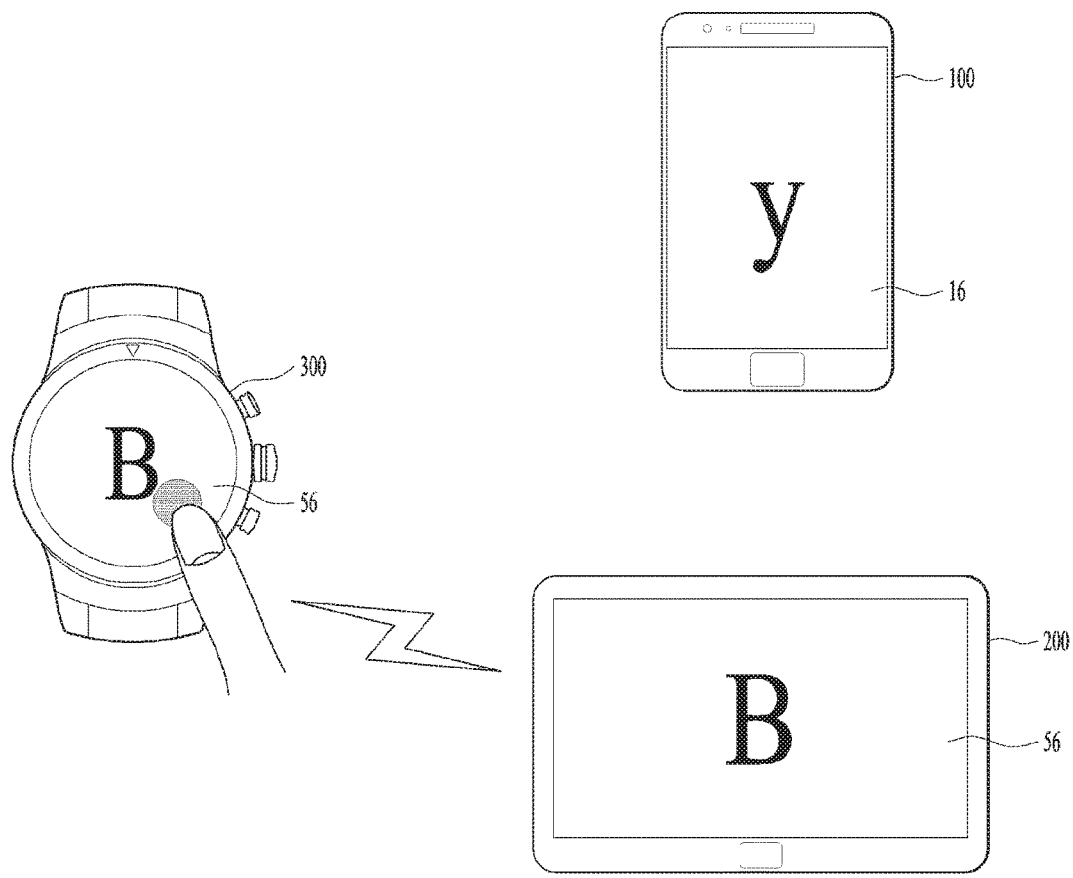
FIG. 14 is a diagram to describe one embodiment for a wearable device to be synchronized with one of a plurality of terminals.

FIG. 14 is a diagram to describe one embodiment for a wearable device to be synchronized with one of a plurality of terminals.

In FIG. 14, a wearable device 300, a $1^{st}$ terminal 100 and a $2^{nd}$ terminal 200 are illustrated. As mentioned in the foregoing description, the wearable device 300 can perform a process for synchronization with external terminals. If the display device 100 receives an input of a synchronization command, as the display device 100 becomes a host, a phone call or the like received by the external terminal can be forwarded to the display device 100. If the wearable device 300 receives an input of a synchronization command, as the wearable device 300 becomes a host, a phone call or the like received by the external terminal can be forwarded to the wearable device 300. Each of the $1^{st}$ terminal 100 and the $2^{nd}$ terminal 200 may belong to a prescribed type of a display device.

In response to a long touch input, the wearable device 300 may alternately display a $1^{st}$ image, a $2^{nd}$ image and a $3^{rd}$ image based on preset times. For instance, the $1^{st}$ image may include an image indicating a synchronization with the $1^{st}$ terminal 100, the $2^{nd}$ image may include an image indicating a synchronization with the $2^{nd}$ terminal 200, and the $3^{rd}$ image may include an image indicating synchronizations with the $1^{st}$ terminal 100 and the $2^{nd}$ terminal 200.

Referring to FIG. 14, the wearable device 300 may display an image B 56 that is the $2^{nd}$ image. The wearable device 300 may perform a process for synchronization with the $2^{nd}$ terminal 200 based on the image B. If the synchronizing process is ended, each of the wearable device 300 and the $2^{nd}$ terminal 200 can display the same image B 56. And, the $1^{st}$ terminal 100 may keep displaying a currently displayed image y 16.

In particular, a user can easily recognize that what kinds of devices are synchronized with each other by watching a background image of a peripheral terminal only. Meanwhile, after the display device 100 and the wearable device 300 have been synchronized with an external terminal, if receiving the same touch gesture, the display device 100 and the wearable device 300 release the synchronization and can operate individually.

If the display device 100 or the wearable device 300 is synchronized with a terminal, a phone call or the like received by the synchronized terminal can be forwarded to the display device 100 or the wearable device 300. The display device 100 or the wearable device 300 can share data and the like with the synchronized terminal. In the following description, a method of sharing data between terminals synchronized with each other is explained in detail with reference to the accompanying drawings.

Figure 15:
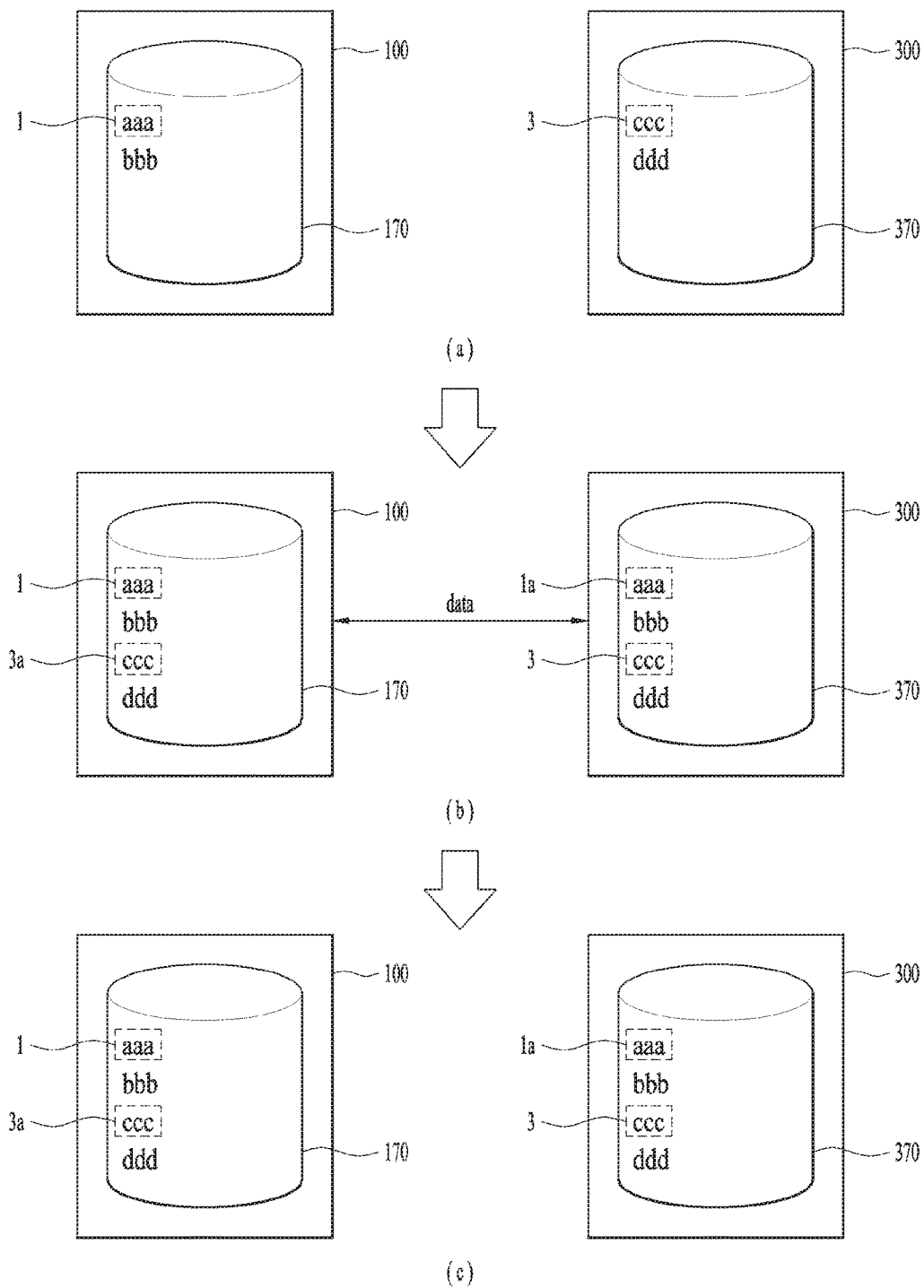
FIG. 15 is a diagram to describe synchronization between a display device and a wearable device according to one embodiment of the present invention.

FIG. 15 is a diagram to describe synchronization between a display device and a wearable device according to one embodiment of the present invention.

Referring to FIG. 15(a), a display device 100 and a wearable device before synchronization are illustrated. A storage unit 170 of the display device 100 can store a data aaa 1 and a storage unit 370 of the wearable device 300 can store a data ccc 3. Data may include a phonebook, an image, a video, an app, an audio file or the like. Since the display device 100 and the wearable device 300 can be independently activated, they can include different data, respectively.

Referring to FIG. 15(b), the display device 100 and the wearable device 300 synchronized with each other are illustrated. If the display device 100 and the wearable device 300 are synchronized with each other, the wearable device 300 can be ready to forward a received phone call and the like to the display device 100. Moreover, the display device 100 and the wearable device 300 can share the stored data with each other. A sharing method shown in FIG. 15(b) includes a method of transceiving data itself with each other. In particular, the display device 100 is able to transmit the stored data itself to the wearable device 300 and the wearable device 300 is able to transmit the stored data itself to the display device 100. If the wearable device 300 transmits its data itself to the display device 100, the display device 100 compares the received data to the stored data and is then able to transmit data not owned by the wearable device 300 to the wearable device 300. Alternatively, the display device 100 and the wearable device 300 may be able to play opposite roles, respectively. Hence, the display device 100 can store the stored data aaa 1 and the received data ccc 3a. And, the wearable device 300 ca store the stored data ccc 3 and the received data aaa 1a.

Referring to FIG. 15(c), the display device 100 and the wearable device 300, of which synchronization is ended, are illustrated. Since the display device 100 and the wearable device 300 have transmitted the data themselves to each other, although the synchronization is ended, the display device 100 and the wearable device 300 can contain the received data. In particular, the display device 100 can store the data aaa 1 and the data ccc 3a. And, the wearable device 300 can store the data aaa 1a and the data ccc 3.

Data may be shared between a display device 100 and a wearable device 300 by a different method.

Figure 16:
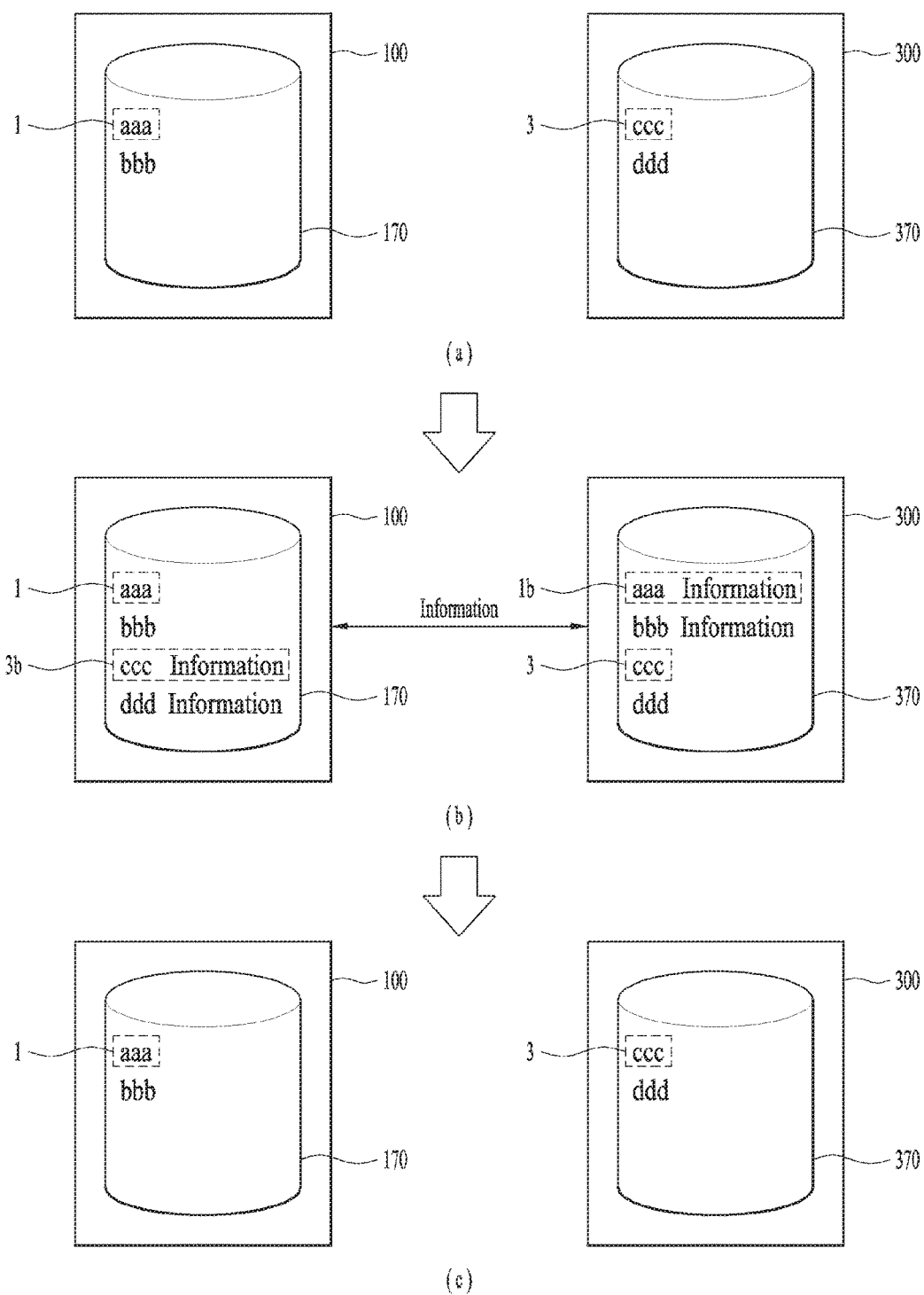
FIG. 16 is a diagram to describe synchronization between a display device and a wearable device according to another embodiment of the present invention.

FIG. 16 is a diagram to describe synchronization between a display device and a wearable device according to another embodiment of the present invention.

Referring to FIG. 16(a), a display device 100 and a wearable device before synchronization are illustrated. A storage unit 170 of the display device 100 stores a data aaa 1 and a storage unit 370 of the wearable device 300 stores a data ccc 3.

Referring to FIG. 16(b), the display device 100 and the wearable device 300 synchronized with each other are illustrated. If the display device 100 and the wearable device 300 are synchronized with each other, the wearable device 300 can be ready to forward a received phone call and the like to the display device 100. Moreover, the display device 100 and the wearable device 300 can share the stored data with each other. A sharing method shown in FIG. 16(b) includes a method of transceiving data information. In particular, the display device 100 is able to transmit the stored data information to the wearable device 300 and the wearable device 300 is able to transmit the stored data information to the display device 100 as well. For instance, the data information may include a data location information, a link information thumbnail image, an icon and the like. Hence, the display device 100 can store the stored data aaa 1 and an information 3b of the received data ccc. And, the wearable device 300 ca store the stored data ccc 3 and an information 1b of the received data aaa. Each of the display device 100 and the wearable device 300 can temporarily store the received data information.

Referring to FIG. 16(c), the display device 100 and the wearable device 300, of which synchronization is ended, are illustrated. The display device 100 and the wearable device 300 have transmitted the data informations to each other. Since the display device 100 and the wearable device 300 have stored the received data informations temporarily, if the synchronization is ended, each of the display device 100 and the wearable device 300 can delete the received data information. Hence, the display device 100 stores the data aaa 1 and is able to delete the stored information 3b of the data ccc. The wearable device 300 stores the data ccc 3 and is able to delete the information 1b of the data aaa.

Meanwhile, each of the display device 100 and the wearable device 300 can display a previously stored data and a data received from the other device in a manner of distinguishing the previously stored data and the received data from each other.

Figure 17:
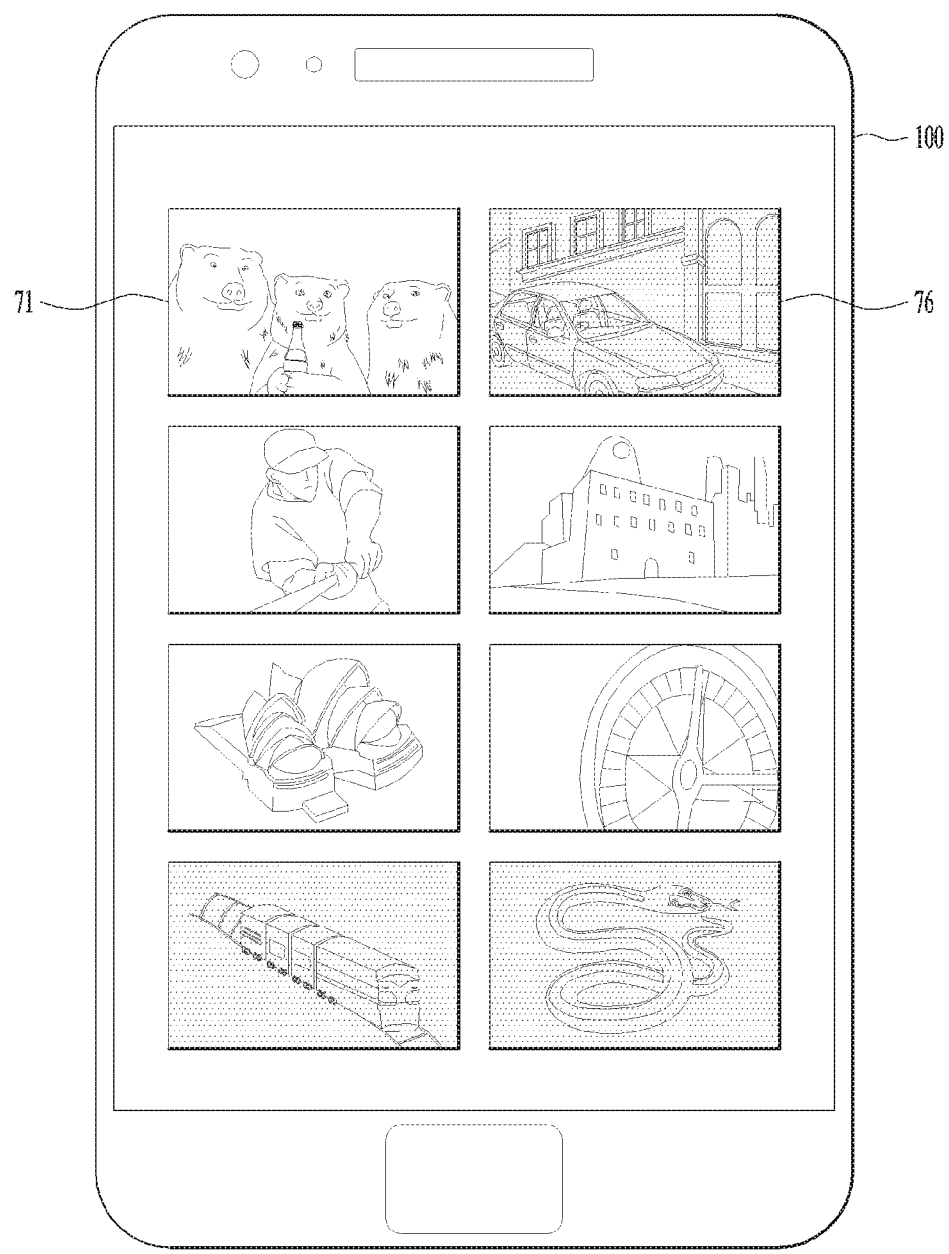
FIG. 17 is a diagram for one embodiment of a screen having a synchronized data displayed thereon.

FIG. 17 is a diagram for one embodiment of a screen having a synchronized data displayed thereon.

Referring to FIG. 17, a display device 100 is illustrated. In this case, an image is displayed on the display device 100. The display device 100 can display the image in form of a thumbnail. After the display device 100 has been synchronized with a wearable device 300, if the display device 100 displays images, the display device 100 can display the image received from the wearable device 300 as well. The display device 100 may normally display a stored image 71 previously stored in the display device 100. And, the display device 100 can display a received image 76 received from the wearable device 300 in a manner of setting a preset attribute of the received image 76.

For instance, the display device 100 sets a transparency for the received image 76 and is then able to display the received image 76 semi-transparently. And, the display device 100 is able to display the received image 76 in a manner of emphasizing an outline of the received image 76 or adding color to the received image 76. In case that a received data is a text data like a phonebook, the display device 100 can display the received data in a manner of applying attribute values to a font, a thickness and the like of a received text. Likewise, the wearable device 300 can display a data received from the display device 100 in a manner of applying attribute values of a transparency, a font, a thickness and the like to the received data.

If a display device 100 or a wearable device is synchronized with a different terminal, a phone call and the like received by the different terminal can be forwarded to the display device 100 or the wearable device 300.

FIG. 18 is a diagram for one embodiment of a function of forwarding a received call.

Referring to FIG. 18(a), a display device 100 for forwarding a received phone all to a wearable device 300 is illustrated. If the wearable device 300 is synchronized with the display device 100, the display device 100 can forward a received phone call to the wearable device 300. As mentioned in the foregoing description, each of the display device 100 and the wearable device 300 is able to include a separate modem and a separate user identity module. Hence, each of the display device 100 and the wearable device 300 can independently make a phone call to a counterpart basically. Yet, for user's convenience, a received phone call can be forwarded to an external device.

Meanwhile, the display device 100 determines a caller in accordance with a preset condition and is then able to forward a received phone call to the wearable device 300 or ignore the received phone call. Generally, a user may want an important phone call or a phone call from an acquaintance to be forwarded to the user. Yet, a user may want an anonymous phone call or a spam phone call not to be forwarded to the user. Hence, if a caller is the person saved in a phonebook, the display device 100 can forward a received phone call to the wearable device 300.

Referring to FIG. 18(b), the display device 100 failing to forward a received call to the wearable device 300 is illustrated. The display device 100 may receive a phone call from an anonymous person. Hence, the display device 100 may not forward the phone call received from the anonymous person to the wearable device 300.

The display device 100 can forward a phone call received from a person saved in a phonebook to the wearable device 300. The display device 100 may or may not forward a received phone call to the wearable device 300 for a time set up by a user. For instance, a user can set a time from 7 AM to 9 AM for an incoming call forward rejection. In this case, the display device 100 may not forward phone calls received between 7 AM to 9 AM to the wearable device 300. A user may set a time from 7 PM to 9 PM for an incoming call forward grant. In this case, the display device 100 can forward all phone calls received between 7 PM to 9 PM to the wearable device 300. An incoming call forward menu may be set up in the wearable device 300 or the display device 100.

When the display device 100 forwards an incoming call to the wearable device 300, the display device 100 may forward the incoming call in direct or after an elapse of a preset time. For instance, if the display device 100 is synchronized with the wearable device 300, the display device 100 directly forwards an incoming call to the wearable device 300 so that only the wearable device 300 can output an ringtone or a vibration. Alternatively, the display device 100 outputs a ringtone or vibration indicating an incoming call during a preset time. If a user does not answer the phone, the display device 100 can forward the incoming call to the wearable device 300.

According to the embodiment described with reference to FIG. 18, the display device 100 forwards the incoming call to the wearable device 300. Instead, the wearable device 300 may forward an incoming call to the display device 100 as well.

Meanwhile, aside from the incoming call forward menu, the display device 100 or the wearable device 300 can automatically hand over an incoming call.

FIG. 19 is a diagram to describe one embodiment for a display device to hand over an incoming call to a wearable device.

Referring to FIG. 19(a), a wearable device 300 synchronized with a display device 100 is illustrated. As mentioned in the foregoing description, since the display device 100 is able to perform all functions independently, although the display device 100 is synchronized with the wearable device 300, the display device 100 can perform a call function. Yet, as a battery of the display device 100 is almost consumed, the display device may not be able to perform a call for a long time. If a remaining battery level of the display device 100 is just enough to output a battery warning sound, the display device 100 may perform a handover into the wearable device 300 automatically.

The display device 100 transmits a notification related to a handover to a counterpart and is able to display the notification indicating the handover on its screen. And, the display device 100 enables an incoming call to be handed over into the synchronized wearable device 300.

Referring to FIG. 19(b), the wearable device 300 into which an incoming call is handed over is illustrated. If the display device 100 hands over the incoming call into the wearable device 300, a user can continue to make a phone call to the counterpart through the wearable device 300.

Meanwhile, since each of the display device 100 and the wearable device 300 includes a modem and a user identity module, each of the display device 100 and the wearable device 300 should subscribe in a service provider individually. Each of the display device 100 and the wearable device 300 may have a different data or call allowance depending on a subscription condition. For one example, if the data allowance of the display device 100 is consumed all, the display device 100 may use the data allowance of the wearable device 300 by being synchronized with the wearable device 300.

Since the display device 100 and the wearable device 300 are different devices, they may be spaced apart from each other in a long distance. For instance, a user currently wearing the wearable device 300 may lose the display device 100. If the display device 100 and the wearable device 300 are spaced apart from each other over a preset distance, they can transceive location informations with each other.

FIG. 20 is a diagram to describe one embodiment for a display device and a wearable device to transceive location information.

Referring to FIG. 20(a), a user currently wears a wearable device 300 but leave a display device 100 in a car. Since the display device 100 and the wearable device 300 are separate devices, as shown in FIG. 20(a), the user may leave one device nearby but leave another device in a remote place. Moreover, the user may lose one of the devices. Hence, one device can transmit its location information to the other.

Referring to FIG. 20(b), the display device 100 transmits a location information to the wearable device 300. If the display device 100 and the wearable device 300 are synchronized with each other, the display device 100 and the wearable device 300 can perform communications periodically. If the display device 100 gets away from the wearable device 300 over a preset distance, the display device 100 can automatically turn on a GPS. And, the display device 100 can transmit a location information to the wearable device 300. Subsequently, the wearable device 300 can display the location information received from the display device 100 on a map.

According to one embodiment, a device to which a user inputs a synchronization command may become a device for receiving a location information, while the other device can become a device for transmitting the location information. The wearable device 300 may include a human body signal detection sensor. If the wearable device 300 recognizes that it is worn by a user using the human body signal detection sensor, the wearable device 300 can become a device for receiving a location information. On the contrary, the display device 100 may become a device for receiving a location information. Alternatively, a location information transmitting device and a location information receiving device may be determined by user's settings.

The location information receiving device may transmit a rest command to the location information transmitting device. If the location information receiving device transmits a rest command to the location information transmitting device, the location information transmitting device can be reset by deleting all saved data. The location information transmitting device can transmit an information, which indicates a lost device, to a subscribed communication network service provider before resetting the data.

Hence, it is advantageous in that the display device 100 or the wearable device 300 can be prevented from being lost. And, it is also advantageous in that personal information can be protected despite that the display device 100 or the wearable device 300 is lost.

So far, various embodiments of the synchronizing system are described. In the following description, a method of controlling a display device 100, a method of controlling a wearable device 300, and a method of controlling a synchronizing system are explained in detail with reference to the accompanying drawings.

Figure 21:
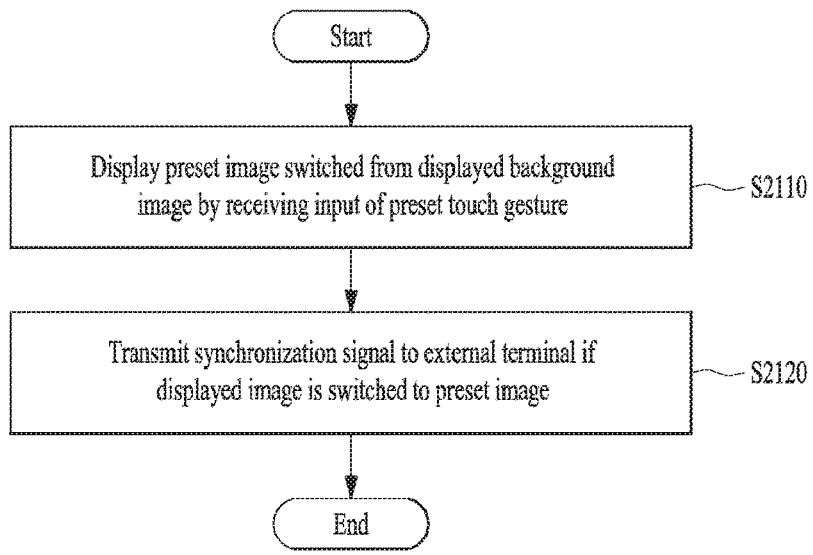
FIG. 21 is a flowchart for a method of controlling a display device according to one embodiment of the present invention.

FIG. 21 is a flowchart for a method of controlling a display device according to one embodiment of the present invention.

Referring to FIG. 21, if a display device receives an input of a preset touch gesture, the display unit switches a displayed background image to a preset image and then displays the preset image [S2110]. In doing so, the display device can perform a function of synchronization with an external terminal by receiving a preset gesture. For instance, the external terminal may include a wearable device. If the display device is synchronized with the wearable device, a phone call received by the wearable device can be forwarded to the display device. If a remaining battery level of the display device is low, the display device can automatically handover over an incoming call into the wearable device. If the wearable device gests away from the display device over a preset distance, the display device can automatically receive a location information from the wearable device.

The display device can recognize various touch gestures as synchronization commands. For instance, the display device may recognize at least one of a long touch gesture, a two-finger touch gesture, a knock touch gesture and a flicking touch gesture as a synchronization command.

In case that a plurality of synchronizable external terminals exist, the display device may contain a plurality of preset images. A plurality of the preset images may be mapped to at least one or more external terminals, respectively. For instance, a $1^{st}$ image may be mapped to a $1^{st}$ terminal, a $2^{nd}$ image may be mapped to a $2^{nd}$ terminal, and a $3^{rd}$ image may be mapped to a $3^{rd}$ terminal. A plurality of the preset images may be displayed in sequence in response to an input of a touch gesture.

If the displayed image is switched to the preset image, the display device may transmit a synchronization signal to the external terminal [S2120]. If the external terminal is synchronized with the display device, it can display the same image as displayed by the display device.

Figure 22:
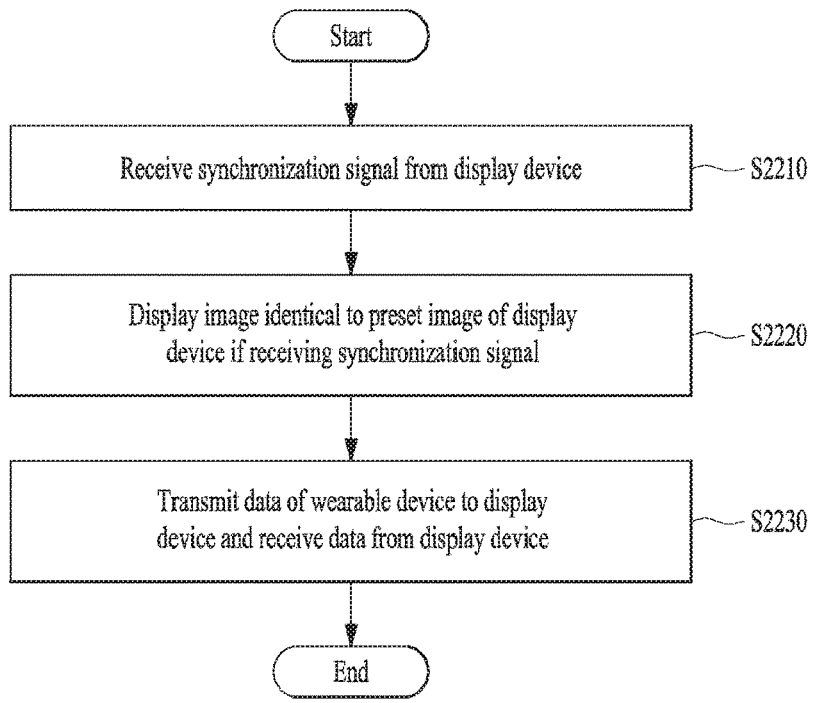
FIG. 22 is a flowchart for a method of controlling a wearable device according to one embodiment of the present invention.

FIG. 22 is a flowchart for a method of controlling a wearable device according to one embodiment of the present invention.

Referring to FIG. 22, a wearable device receives a synchronization signal from a display device [S2210]. For instance, the external terminal may include a display device. If the wearable device receives the synchronization signal, the wearable device may control an incoming call or the like to be forwarded to the display device.

If the wearable device receives the synchronization signal, the wearable device displays an image identical to a preset image of the external terminal [S2220]. As the wearable device displays the same image as displayed by the external terminal, a user can check a presence or non-presence of the synchronization easily and conveniently.

The wearable device transmits data to the external terminal and receives data from the external terminal [S2230]. For instance, the data may include a phonebook, an image, a video, an audio file, an app and the like. The wearable device can transmit data itself or information related to the data to the external terminal. The wearable device can display both of the stored data and the data received from the external terminal. In particular, the wearable device can display the data in a manner of setting a preset attribute to the received data, thereby enabling the received data to be distinguished from the stored data.

FIG. 23 is a timing diagram for a method of controlling a synchronizing system according to one embodiment of the present invention.

Referring to FIG. 23, if a display device 100 receives an input of a preset touch gesture, the display device 100 switches a displayed image to a preset image and then displays the preset image [S2310]. In this case, the display device 100 and the wearable device 300 are independent devices, respectively. Hence, each of the display device 100 and the wearable device 300 can display a different background image. Yet, if the display device 100 and the wearable device 300 interwork with each other by being synchronized together, each of the display device 100 and the wearable device 300 can display the same image.

The display device 100 transmits a synchronization signal to the wearable device 300 [S2320]. The wearable device displays an image identical to the preset image of the display device 100 [S2330]. If the wearable device 300 receives the synchronization signal from the display device 100, the wearable device 300 displays the same image and is then able to perform a synchronizing process. Alternatively, after completion of the synchronizing process, the wearable device 300 may display the same image as displayed by the display device 100.

Subsequently, the display device 100 and the wearable device 300 transceive data with each other [S2340]. As mentioned in the foregoing description, the display device 100 and the wearable device 300 may share data with each other by exchanging data itself or information on the data with each other. Thereafter, the display device 100 and the wearable device 300 are synchronized with each other [S2351, S2352].

INDUSTRIAL APPLICABILITY

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
    a display switching a displayed background image to a preset image in response to receiving an input of a preset touch gesture, the display device displaying the preset image; and
    a controller controlling a circuit component to communicate with an external terminal and to transmit a synchronization signal to the external terminal when the displayed background image is switched to the preset image,
    wherein when a plurality of external terminals exist, a plurality of preset images exist and wherein each of the plurality of preset images is mapped to at least one external terminal to be synchronized, and
    wherein the controller controls the display to display the plurality of preset images sequentially in response to the input of the preset touch gesture.

2. The display device of claim 1, wherein the controller performs synchronization by transmitting data from the display device to the external terminal and receiving data from the external terminal.

3. The display device of claim 2, wherein the controller controls the display to display the data of the synchronized external terminal by setting a preset attribute for the data of the synchronized external terminal to be distinguished from the data of the display device.

4. The display device of claim 3, wherein the preset attribute comprises at least one selected from the group consisting of a transparency, a color, a font, and a thickness.

5. The display device of claim 2, wherein when a distance between the synchronized external terminal and the display device becomes greater than a preset threshold distance, the controller automatically activates a Global Position System (GPS) and controls the circuit component to transmit location information to the external terminal.

6. The display device of claim 1, wherein the preset touch gesture comprises at least one selected from the group consisting of a long touch gesture, a two-finger touch gesture, a knock touch gesture, and a flicking touch gesture.

7. The display device of claim 6, wherein the flicking touch gesture comprises a touch to at least one of a preset edge region of the display and a bottom region of the display.

8. A synchronizing system, comprising:
a display device switching a first background image to a preset image in response to receiving an input of a preset touch gesture such that the display device displays the preset image and transmits a synchronization signal to a wearable device in response to the input; and
the wearable device switching a second background image to an image including the preset image displayed at the display device and synchronizing data with the display device in response to the synchronization signal received from the display device.

9. The synchronizing system of claim 8, wherein the second background image is different from the first background image.

10. The synchronizing system of claim 9, wherein the preset image displayed at the wearable device is an image that has not been displayed at the wearable device prior to receiving the synchronization signal and indicates that the synchronization is performed between the display device and the wearable device.

11. A method of controlling a synchronizing system, the method comprising:
switching a first background image to a preset image in a display device in response to receiving an input of a preset touch gesture at the display device;
displaying the preset image in the display device in response to the input;
transmitting, by the display device, a synchronization signal to a wearable device in response to the input;
switching a second background image to an image including the preset image displayed at the display device in the wearable device in response to the synchronization signal received from the display device; and
synchronizing data with the display device in the wearable device in response to the synchronization signal.

12. The method of claim 11, wherein the second background image is different from the first background image.

13. The method of claim 12, wherein the preset image displayed at the wearable device is an image that has not been displayed at the wearable device prior to receiving the synchronization signal and indicates that the synchronization is performed between the display device and the wearable device.

* * * * *